United States Patent

Cong et al.

[11] Patent Number: 6,067,515
[45] Date of Patent: *May 23, 2000

[54] SPLIT MATRIX QUANTIZATION WITH SPLIT VECTOR QUANTIZATION ERROR COMPENSATION AND SELECTIVE ENHANCED PROCESSING FOR ROBUST SPEECH RECOGNITION

[75] Inventors: Lin Cong; Safdar M. Asghar, both of Austin, Tex.

[73] Assignee: Advanced Micro Devices, Inc., Sunnyvale, Calif.

[*] Notice: This patent is subject to a terminal disclaimer.

[21] Appl. No.: 08/957,903

[22] Filed: Oct. 27, 1997

[51] Int. Cl.$^7$ .................................................. G10L 9/00
[52] U.S. Cl. ........................ 704/243; 704/222; 704/256; 704/251
[58] Field of Search .................................. 704/222, 256, 704/243, 251

[56] References Cited

U.S. PATENT DOCUMENTS

| | | | |
|---|---|---|---|
| 4,383,135 | 5/1983 | Scott et al. | 179/1 SD |
| 4,519,094 | 5/1985 | Brown et al. | 381/43 |
| 4,933,973 | 6/1990 | Porter | 381/43 |
| 4,975,955 | 12/1990 | Taguchi | 381/36 |
| 5,031,217 | 7/1991 | Nishimura | 381/43 |
| 5,046,099 | 9/1991 | Nishimura | 381/43 |
| 5,185,848 | 2/1993 | Aritsuka et al. | 395/2 |
| 5,228,087 | 7/1993 | Bickerton | 381/43 |
| 5,255,339 | 10/1993 | Fette et al. | 395/2 |
| 5,285,522 | 2/1994 | Mueller | 395/2.41 |
| 5,313,555 | 5/1994 | Kamiya | 395/2.42 |
| 5,414,796 | 5/1995 | Jacobs et al. | 395/2.3 |
| 5,583,888 | 12/1996 | Ono | 375/240 |
| 5,596,679 | 1/1997 | Wang | 395/2.45 |
| 5,625,747 | 4/1997 | Goldberg et al. | 395/2.52 |
| 5,696,878 | 12/1997 | Ono et al. | 395/2.59 |
| 5,734,793 | 3/1998 | Wang | 395/2.41 |

OTHER PUBLICATIONS

Lin Cong "A Study of Robust IWSR Systems", May 1996.
Xydeas, C.S. Prof. and Cong, Lin "Robust Speech Recognition Using Fuzzy Matrix Quantisation, Neural Networks and Hidden Markov Models" 1996 pp. 1587–1590.

(List continued on next page.)

*Primary Examiner*—David R. Hudspeth
*Assistant Examiner*—Daniel Abebe
*Attorney, Agent, or Firm*—Skjerven, Morrill, MacPherson, Franklin & Friel, LLP; Kent B. Chambers

[57] ABSTRACT

A speech recognition system utilizes both split matrix and split vector quantizers as front ends to a second stage speech classifier such as hidden Markov models (HMMs) to, for example, efficiently utilize processing resources and improve speech recognition performance. Fuzzy split matrix quantization (FSMQ) exploits the "evolution" of the speech short-term spectral envelopes as well as frequency domain information, and fuzzy split vector quantization (FSVQ) primarily operates on frequency domain information. Time domain information may be substantially limited which may introduce error into the matrix quantization, and the FSVQ may provide error compensation. Additionally, acoustic noise influence may affect particular frequency domain subbands. This system also, for example, exploits the localized noise by efficiently allocating enhanced processing technology to target noise-affected input signal parameters and minimize noise influence. The enhanced processing technology includes a weighted LSP and signal energy related distance measure in training Linde-Buzo-Gray (LBG) algorithm and during recognition. Multiple codebooks may also be combined to form single respective codebooks for split matrix and split vector quantization to lower processing resources demand.

58 Claims, 2 Drawing Sheets

OTHER PUBLICATIONS

Cong, Ling, Xydeas, Costas S. Prof. and Ferwood, Anthony F. Combining Fuzzy Vector Quantization and Neural Network Classification for Robust Isolated Word Speech Recognition: Singapore ICCS 1994, pp. 884–887.

Parsons, Thomas W.; "Voice and Speech Processing"; McGraw–Hill, Inc., New York, 1987, pp. 170–171.

Xydeas, C.S. and Lin Cong; "Robust Speech Recognition Using Fuzzy Matrix Quantization and Neural Networks"; Proceedings of International Conference on Communication Technology; Beijing, China—ICCT '96; pp. 432–435; IEEE; New York (May 5–7, 1996).

Cong, Lin; "A Study of Robust IWSR Systems"; PhD Thesis submitted to The University of Manchester School of Engineering, Division of Electrical Engineering; Manchester, United Kingdom; pp. 1–209. May 1996.

Waibel, Alexander; "Neural Network Approaches for Speech Recognition"; Chapter 18 of *Advances in Speech Signal Processing*; edited by Sadaoki Surui and M. Mohan Sondhi; Marcel Dekker, Inc.; New York, New York; 1992; pp. 555–595.

Xydeas, C. S. and Cong, L.; "Combining Neural Network Classification with Fuzzy Vector Quantization and Hidden Markov Models for Robust Isolated Word Speech Recognition"; *Signal Processing VIII Theories and Applications*, vol. III; Proceedings of the IEEE International Symposium on Information Theory, IEEE Press, 1995, p. 174.

Xydeas, C. S. Cong, L.; "Robust Speech Recognition in A Car Environment"; Presented at DSP95 International Conference on Digital Signal Processing, Jun. 26–28, 1995, Limassol, Cyprus; vol. 1, pp. 84–89.

Cong, Lin, Prof. C.S. Xydeas, and Anthony Ferwood; "A Study of Robust Isolated Word Speech Recognition Based on Fuzzy Methods"; Presented at EUSIPCO–94, VII European Signal Processing Conference, Sep. 13–16, 1994; Scotland, UK.; 4 pages.

Gibson, Jerry D.; "Coding, Transmission, and Storage"; Chapter 14, Speech Signal Processing, of *The Electrical Engineering Handbook*; Editor–in–Chief Richard C. Dorf; ©1993 by CRC Press, Inc.; pp. 279–314.

Gersho, Allen and Shihua Wang; "Vector Quantization Techniques in Speech Coding"; Chapter 2 of *Advances in Speech Signal Processing*; edited by Sadaoki Furui and M. Mohan Sondhi; Marcel Dekker, Inc.; New York, New York; 1992; pp. 49–84.

Kroon, Peter and Bishnu S. Atal; "Predictive Coding of Speech Using Analysis–by–Synthesis Techniques"; Chapter 5 of *Advances in Speech Signal Processing*; edited by Sadaoki Furui and M. Mohan Sondhi; Marcel Dekker, Inc.; New York, New York; 1992, pp. 141–164.

Honda, Masaaki and Yoshiano Shiraki; "Very Low–Bit–Rate Speech Coding"; Chapter 7 of *Advances in Speech Signal Processing*; edited by Sadaoki Furui and M. Mohan Sondhi; Marcel Dekker, Inc.; New York, New York; 1992; pp. 209–230.

Schroeter, Juergen and M. Mohan Sondhi; "Speech Coding Based on Physiological Models of Speech Production"; Chapter 8 of *Advances in Speech Signal Processing*; edited by Sadaoki Furui and M. Mohan Sondhi; Marcel Dekker, Inc.; New York, New York; 1992, pp. 231–268.

Lawrence Rabiner and Biing–Hwang Juang, "Fundamentals of Speech Recognition," Prentice Hall PTR (Englewood Cliffs, New Jersey, 1993), pp. 190–195.

SPLIT MATRIX QUANTIZATION WITH SPLIT VECTOR QUANTIZATION ERROR COMPENSATION AND SELECTIVE ENHANCED PROCESSING FOR ROBUST SPEECH RECOGNITION

BACKGROUND OF THE INVENTION

1. Field of the Invention

This invention relates to speech recognition and more particularly relates to combining split matrix and split vector quantization with selective enhanced processing to provide efficient and robust speech recognition.

2. Description of the Related Art

Speech is perhaps the most important communication method available to mankind. It is also a natural method for man-machine communication. Man-machine communication by voice offers a whole new range of information/communication services which can extend man's capabilities, serve his social needs, and increase his productivity. Speech recognition is a key element in establishing man-machine communication by voice, and, as such, speech recognition is an important technology with tremendous potential for widespread use in the future.

Voice communication between man and machine benefits from an efficient speech recognition interface. Speech recognition interfaces are commonly implemented as Speaker-Dependent (SD)/Speaker-Independent (SI) Isolated Word Speech Recognition (IWSR)/continuous speech recognition ($C_sR$) systems. The SD/SI IWSR/$C_sR$ system provides, for example, a beneficial voice command interface for hands free telephone dialing and interaction with voice store and forwarding systems. Such technology is particularly useful in an automotive environment for safety purposes.

However, to be useful, speech recognition must generally be very accurate in correctly recognizing (classifying) the input signal 101 with a satisfactory probability of accuracy. Difficulty in correct recognition arises particularly when operating in an acoustically noisy environment. Recognition accuracy may be severely and unfavorably impacted under realistic environmental conditions where speech is corrupted by various levels of acoustic noise.

FIG. 1 generally characterizes a speech recognition process by the speech recognition system 100. A microphone transducer 102 picks up a input signal 101 and provides to signal preprocessor 104 an electronic signal representation of the composite input signal 101. The input signal 101 is an acoustic waveform of a spoken input, typically a word, or a connecting string of words. The signal preprocessor 104 may, for example, filter the input signal 101, and a feature extractor 106 extracts selected information from the input signal 101 to characterize the signal with, for example, cepstral frequencies or line spectral pair frequencies (LSPs).

Referring to FIG. 2, more specifically, feature extraction in operation 106 is basically a data-reduction technique whereby a large number of data points (in this case samples of the input signal 101 recorded at an appropriate sampling rate) are transformed into a smaller set of features which are "equivalent", in the sense that they faithfully describe the salient properties of the input signal 101. Feature extraction is generally based on a speech production model which typically assumes that the vocal tract of a speaker can be represented as the concatenation of lossless acoustic tubes (not shown) which, when excited by excitation signals, produces a speech signal. Samples of the speech waveform are assumed to be the output of a time-varying filter that approximates the transmission properties of the vocal tract. It is reasonable to assume that the filter has fixed characteristics over a time interval of the order of 10 to 30 milliseconds. Thus, short-time input signal 101 portion of input signal 101 may be represented by a linear, time-invariant all pole filter designed to model the spectral envelope of the signal in each time frame. The filter may be characterized within a given interval by an impulse response and a set of coefficients.

Feature extraction in operation 106 using linear predictive (LP) speech production models has become the predominant technique for estimating basic speech parameters such as pitch, formants, spectra, and vocal tract area functions. The LP model allows for linear predictive analysis which basically approximates a input signal 101 as a linear combination of past speech samples. By minimizing the sum of the squared differences (over a finite interval) between actual speech samples and the linearly predicted ones, a unique set of prediction filter coefficients can be determined. The predictor coefficients are weighting coefficients used in the linear combination of past speech samples. The LP coefficients are generally updated very slowly with time, for example, every 10–30 milliseconds, to represent the changing vocal tract. LP prediction coefficients are calculated using a variety of well-known procedures, such as autocorrelation and covariance procedures, to minimize the difference between the actual input signal 101 and a predicted input signal 101 often stored as a spectral envelope reference pattern. The LP prediction coefficients can be easily transformed into several different representations including cepstral coefficients and line spectrum pair (LSP) frequencies. Details of LSP theory can be found in N. Sugamura, "Speech Analysis and Synthesis Methods Developed at ECL in NTT-from LPC to LSP", Speech Communication 5, Elsevier Science Publishers, B. V., pp. 199–215 (1986).

Final decision-logic classifier 108 utilizes the extracted information to classify the represented input signal 101 to a database of representative input signal 101. Speech recognition classifying problems can be treated as a classical pattern recognition problem. Fundamental ideas from signal processing, information theory, and computer science can be utilized to facilitate isolated word recognition and simple connected-word sequences recognition.

FIG. 2 illustrates a more specific speech recognition system 200 based on pattern recognition as used in many IWSR type systems. The extracted features representing input signal 01 are segmented into short-term input signal 101 frames and considered to be stationary within each frame for 10 to 30 msec duration. The extracted features may be represented by a D-dimensional vector and compared with predetermined, stored reference patterns 208 by the pattern similarity operation 210. Similarity between the input signal 101 pattern and the stored reference patterns 208 is determined in pattern similarity operation 210 using well-known vector quantization processes. The vector quantization process yields spectral distortion or distance measures to quantify the score of fitness or closeness between the representation of input signal 101 and each of the stored reference patterns 208.

The decision rule operation 212 receives the distance measures and determines which of the reference patterns 208 the input signal 101 most closely represents. In a "hard" decision making process, input signal 101 is matched to one of the reference patterns 208. This one-to-one "hard decision" ignores the relationship of the input signal 101 to all the other reference patterns 208. Fuzzy methods have been introduced to provide a better match between vector quantized frames of input signal 101 and reference patterns 208. In a "soft" or "fuzzy" decision making process, input signal 101 is related to one or more reference patterns 208 by weighting coefficients.

Matrix quantization has also been used to introduce temporal information about input signal 101 into decision rule operation 212. Fuzzy analysis methods have also been incorporated into matrix quantization processes, as described in Xydeas and Cong, "Robust Speech Recognition In a Car Environment", Proceeding of the DSP95 International Conference on Digital Signal Processing, Jun. 26–28, 1995, Limassol, Cyprus. Fuzzy matrix quantization allows for "soft" decision using interframe information related to the "evolution" of the short-term spectral envelopes of input signal 101.

Despite conventional speech recognition progress, research and development continues to focus on more efficient speech recognition systems with higher speech recognition accuracy.

SUMMARY OF THE INVENTION

In one embodiment, a new hybrid speech recognition system combines Fuzzy Split Matrix Quantization (FSMQ) and Fuzzy Split Vector Quantization (FSVQ) with a Hidden Markov Model (HMM) to efficiently utilize processing resources and improve speech recognition performance. This FSMQ/HMM_FSVQ/HMM system exploits the "evolution" of speech short-term spectral envelopes with error compensation from FSVQ/HMM processes. Acoustic noise may affect particular frequency domain subbands. This system exploits localized noise by efficiently allocating enhanced processing technology to target noise-affected input signal parameters and minimize noise influence. The enhanced processing technology employs a weighted LSP and signal energy related distance measure in a LBG algorithm. Computer simulation using gender-dependent HMMs in a speaker-independent (SI) mode clearly indicates superiority over conventional FVQ/HMM and FMQ/HMM systems with 96% and 93.22% recognition accuracies at 20 dB and 5 dB SNR levels, respectively, in a car noise environment.

In one embodiment, vector quantization operates on a single frame of input signal frequency parameters and, at least generally, does not incorporate temporal signal information into the vector quantization operation. However, vector quantization performs particularly well when temporal information is scarce or non-existent, such as with short input signal duration. Matrix quantization operates on multiple input signal frames and, thus, utilizes both temporal and frequency information about the input signal. However, errors may be introduced into matrix quantization operations when operating on a short duration input signal. Thus, although matrix quantization generally leads to a higher recognition accuracy that vector quantization, vector quantization may compensate for matrix quantization errors that may occur when operating on brief duration input signals.

In one embodiment, split vector quantization is included in a speech recognition system to enhance speech recognition accuracy in combination with split matrix quantization. Split vector and split matrices are utilized to, for example, target enhanced processing in frequency areas known to be most corrupted by acoustic noise. Thus, processing resources may be used efficiently.

In one embodiment, multiple speech processing subsystems are employed to provide initial quantization data to respective speech classifiers. Output data from the speech classifiers may be combined in such a way to compensate for quantization errors introduced by the speech processing subsystems. In another embodiment, one of the speech processing subsystems includes a vector quantizer which provides quantization information to a speech classifier having hidden Markov models. Another speech processing subsystem includes a matrix quantizer which provides quantization information to another speech classifier having hidden Markov models. Output data from the respective speech classifiers is combined to, for example, provide error compensation for the matrix quantizer.

In another embodiment of the present invention, a speech recognition system includes a split vector quantizer to receive first parameters of an input signal, to partition the first parameters into $S_1$ partitions, and to generate a first quantization observation sequence, and a first speech classifier to receive the first quantization observation sequence from the split vector quantizer and generate first respective speech classification output data. The speech recognition system further includes a split matrix quantizer to receive second parameters of the input signal, to partition the second parameters into $S_2$ partitions, and generate a second quantization observation sequence, a second speech classifier to receive the second quantization observation sequence from the split matrix quantizer and generate second respective speech classification output data, and a hybrid decision generator to combine corresponding first and second respective speech classification data to generate third respective speech classification data.

In another embodiment of the present invention, a method includes the steps of partitioning first parameters of an input signal into $S_1$ partitions, wherein the parameters include frequency and time domain parameters, and processing the partitioned first parameters of the input signal to relate the partitioned first parameters to first reference data. The method further includes the steps of providing first output data relating the input signal to reference data, partitioning second parameters of the input signal into $S_2$ partitions, wherein the parameters include frequency domain parameters, processing the partitioned second parameters of the input signal to relate the partitioned second parameters to second reference data, providing second output data relating the input signal to the second reference data, and combining the first output data and second output data to compensate for errors in the first output data.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

The following definitions are used herein unless otherwise indicated:

Word—any spoken utterance including words and numbers,

Speech—any word.

The following abbreviations are used herein unless otherwise indicated:

FSMQ—fuzzy split matrix quantizer,

FSVQ—fuzzy split vector quantizer,

SMQ—split matrix quantization,

SVQ—split vector quantization,

HMM—hidden Markov model, $\lambda$—a HMM process, $Pr(O|\lambda)$—probability of $\lambda$ producing observation O, LSP—line spectral pair, dB—decibel, SD/SI—speaker dependent/speaker independent SNR—signal to noise ratio.

Figure 3:
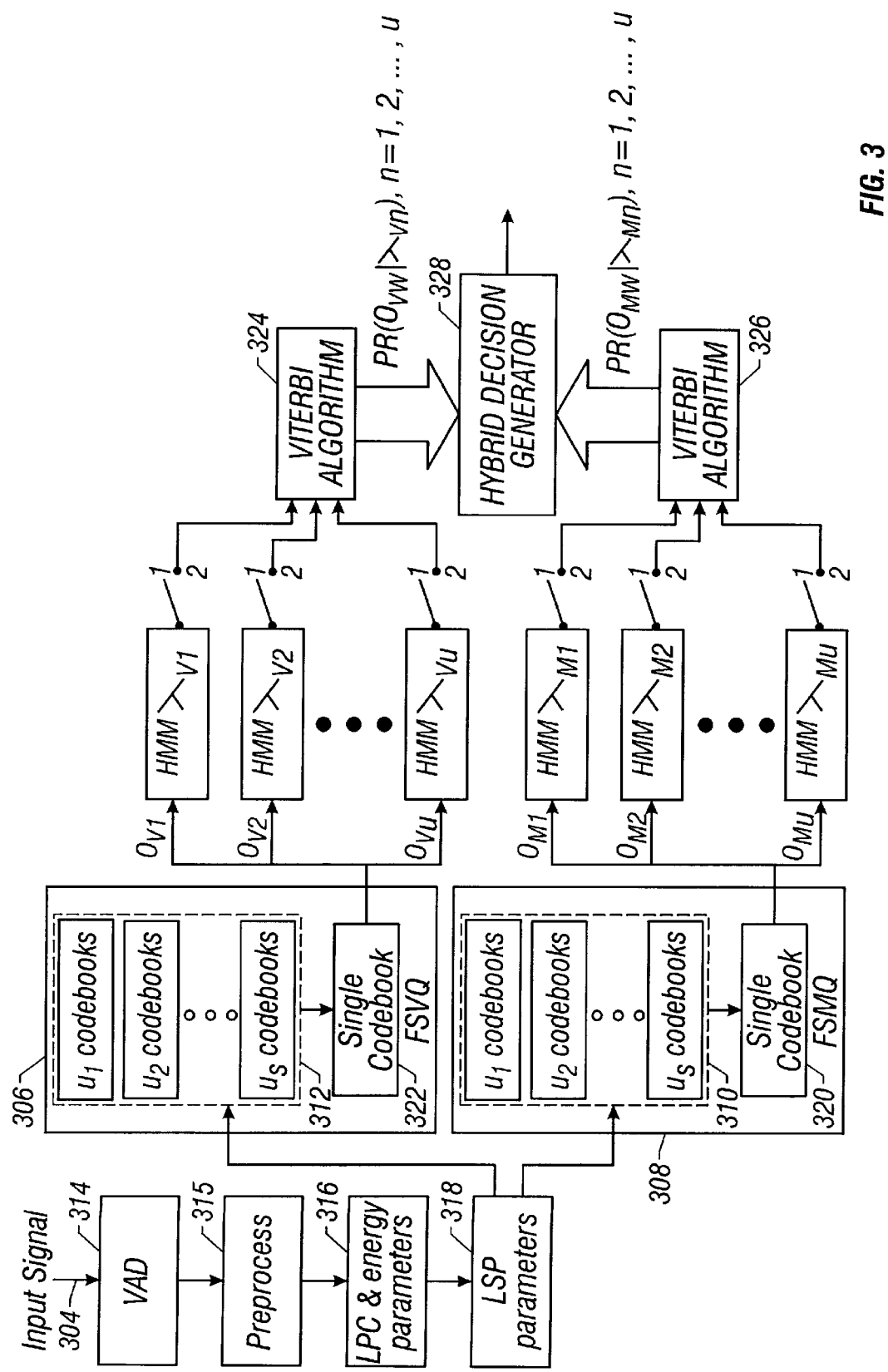
FIG. 3 illustrates a speech recognition system utilizing split vector and split matrix quantizers as a front end to respective hidden Markov model speech classifiers and a hybrid decision generator.

Referring to an embodiment of a speech recognition system in FIG. 3, speech recognition system 300 recognizes an input signal using the combined classification power of both time and frequency domain information derived from split matrix quantization with error compensation from frequency domain information derived from split vector quantization. Fuzzy processes may be implemented to further enhance recognition accuracy as illustratively discussed in chapter 3 of the Doctor of Philosophy thesis of Lin Cong entitled "A Study of Robust IWSR Systems" (L. Cong thesis) and located in the John Rylands University Library of Manchester in Manchester, England, which thesis is hereby incorporated by reference in its entirety. Vector quantization operates on a single frame of input signal frequency parameters and, at least generally, does not incorporate temporal signal information into the vector quantization processing operation. However, vector quantization performs particularly well when temporal information is scarce or nonexistent, such as with short input signal duration. Matrix quantization operates on multiple input signal frames representing the time "evolution" of an input signal and, thus, utilizes both time domain and frequency domain information about the input signal. However, errors may be introduced into matrix quantization processing operations when operating on a short duration input signal. Thus, although matrix quantization generally leads to a higher recognition accuracy than vector quantization, vector quantization information may be utilized to compensate for matrix quantization errors that may occur when operating on input signals having limited useful temporal information.

In typical operational environments, processing resources are limited and efficient utilization is desirable. By utilizing split matrix and split vector quantization techniques, a specific spectral frequency region(s) may be targeted for enhanced processing while more general processing may be applied to another spectral frequency region(s) where the cost of enhanced processing outweighs the benefits. For example, we have observed that in some acoustic environments, noise frequencies are primarily located in lower frequency spectral regions. Thus, input signal parameters may be split into a first group which is primarily affected by the acoustic noise and into a group that is primarily unaffected by the acoustic noise. An enhanced distance measure may be employed in the quantization of the first group to counteract for the acoustic noise corruption of the input signal parameters, and a simpler distance measure may be employed in conjunction with quantization of the second group. Thus, processing resources may be efficiently allocated more heavily to processing the first group of parameters while using less but sufficient processing resources to process the second group of parameters. An exemplary enhanced distance measure is illustratively described in U.S. patent application Ser. No. 08/883,980 by Safdar M. Asghar and Lin Cong entitled "Robust Distance Measure In A Speech Recognition System" (Asghar and Cong, "Robust Distance Measure"), which is hereby incorporated by reference in its entirety. Generally, $S_V$ groups of parameters may be separated for fuzzy split vector quantization and $S_M$ groups of parameters may be separated for fuzzy split matrix quantization. The groups may be separated on the basis of, for example, isolating groups primarily affected by localized noise.

In addition to split matrix and split vector quantization, the speech recognition system 300 may further utilize probabilistic processes to further enhance speech recognition accuracy. Split matrix and split vector quantizers serve as front end speech classifiers to provide observation sequences to respective HMMs in order to characterize the HMMs during training. Each of the HMMs are preferably trained for a single word. During speech recognition processes, the respective HMMs and a Viterbi algorithm provide probabilistic output data which relate the input speech signal to a specific HMM. A hybrid decision generator combines the HMM output data corresponding to vector quantization and HMM output data corresponding to matrix quantization. The combination may, for example, weight the vector and/or matrix related HMM output data to, for example, compensate for matrix quantization error and, thus, enhance recognition accuracy. The speech recognition system 300 may be utilized in conjunction with SD/SI speech recognition.

Also, a single codebook may be employed by split matrix and vector quantizers to efficiently process input signal parameters for speech recognition. Quantization with a single codebook is illustratively described in U.S. patent application Ser. No. 08/883,979 by Safdar M. Asghar and Lin Cong and entitled "Speech Recognition System Using A Single Robust Codebook", which is hereby incorporated by reference in its entirety.

The speech recognition system 300 may be implemented in an electronic system as instructions and data stored in a memory and utilized by a processor or processors coupled to the memory.

Referring to FIG. 3, in preparation for speech recognition with the flow path 321 set to position 1, speech recognition system 300 undergoes a training process to design respective codebooks for the FSVQ 306 and FSMQ 308. A data base of u words repeated r times and corrupted by q different levels of acoustic noise is used during the training process, where u corresponds to the vocabulary size of speech recognition system 300, and q and r are positive integers, for example, seven and two, respectively.

Initially during training of FSVQ 306 and FSMQ 308, a single codebook is designed for each of the u words in each of the S matrices for each of FSVQ 306 and FSMQ 308. Thus, uS matrix codebooks 310 and uS vector codebooks 312 are respectively designed with the nth word, n=1, 2, . . . u, being repeated r times at q SNR levels. Speech recognition system 300 is designed for robustness by training with multiple acoustic noise SNR corruption levels to better model realistic input signal 304 input conditions where speech is corrupted by acoustic noise. In the embodiment of FIG. 3, the respective SNR levels used to train speech recognition system 300 are clean speech (∞), 35 dB, 25 dB, 20 dB, 15 dB, 10 dB, and 5 dB to model various noises in an automotive environment. Other SNR values may be chosen to model other acoustic environments or more extensively model the automotive environment. Thus, a total training database of r times q (rq) entries is used to design each of the uS matrix codebooks 310 and uS vector codebooks 312. Each of the uqr entries in the total training database is respectively provided as input signal 304 to speech recognition system 300 and preprocessed by preprocess operation 315 which, for example, band limits input signal 304 to 3.6 kHz and samples input signal 304 at 8 ksamples/sec with a resolution of 16 bits per sample. During speech recognition, when continuous speech is produced, voice activity detector (VAD) 314 effectively defines end points of input signal 304 words for SD/SI independent word speech recognition.

Figure 1:
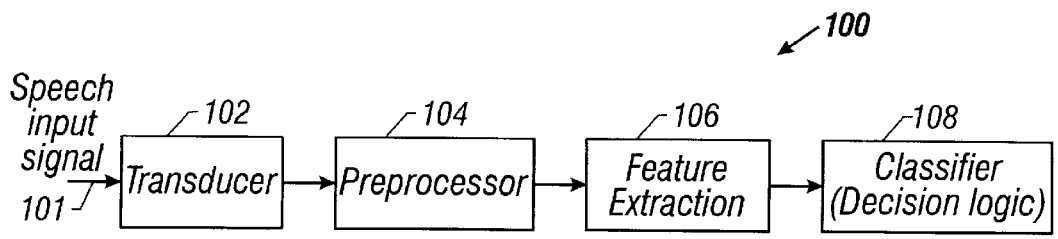
FIG. 1, labeled prior art, illustrates a general speech recognition system.
Figure 2:
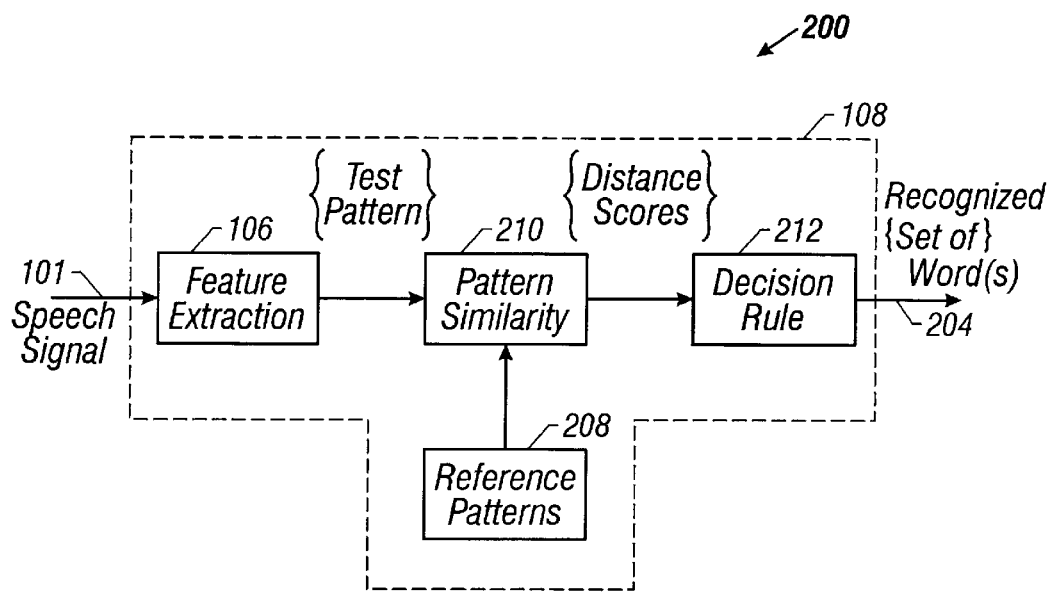
FIG. 2 illustrates a pattern-recognition based speech recognition system.
Figure 4:
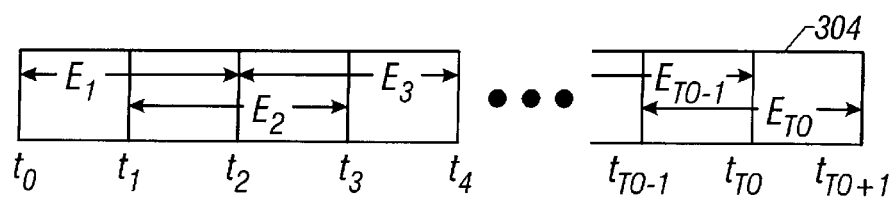
FIG. 4 illustrates a sequence of frames defining a speech input signal.

Referring to FIGS. 3 and 4, a D order linear predictive code (LPC) analysis is performed in LPC and energy parameters operation 316 on each of the TO frames of input signal 304 to compute the LPC coefficients for the acoustic signal 304 frame using, for example, the Burg algorithm. A 10 msec overlap is provided between frames, and each of the TO frames is defined by a time window Of $t_{a+1}$ to $t_{a+2}$, a=0 through TO−1, with an overlap by an adjacent frame of $t_{a+1}$ to $t_{a+2}$. D may vary depending on tradeoffs between desired resolution and processing speed and in this embodiment, D is generally in the range of ten to sixteen, and is, for example, twelve. Frame times may vary and are, in general, chosen to represent an approximately static vocal tract period in a range of, for example, 10–30 msec, and are, for example, 20 msec.

Energy parameters may be generated in LPC and energy parameters operation 316 for each frame of each input signal 304. Spectral frequency parameters alone may be used to characterize an input signal 304 and codewords. Additionally, both energy and spectral frequency parameters may be used to characterize input signal 304 and codewords and to generate a quantization distance measure. When the input signal 304 is corrupted by an acoustic noise signal, a distance measure using determined energy and frequency parameters enhances the distinction between respective input signals by at least partially suppressing the noise signal component of the input signal 304. For example, during an interval of time, acoustic noise signal energy is relatively constant in the time domain while the speech word signal energy typically varies more substantially during the same interval of time. By determining the first derivative or change of the input signal energy over different intervals of time, corruption by a noise signal with relatively constant energy may be significantly eliminated to enhance the distinction between respective input signal words. Furthermore, the energy of the second derivative or change of the input signal first energy derivative during the same intervals of time may be used to further enhance the distinction between respective input signal words. Furthermore, as described in more detail below, error factors may be derived and employed in the distance measure to further address acoustic noise corruption of the input signal 304 parameters.

Additionally, during predetermined time intervals, words typically have unique energy "signatures", and, thus, utilizing input signal energy parameters can be used to increase classification accuracy. The energy, $E_y$, in each frame of the input signal 304 may be used during training to develop codeword parameters in FSVQ 306 and FSMQ 308, and be used during recognition to compare input signal 304 energy parameters to corresponding codeword parameters derived from energy parameters of training database entries. The utilization of input signal energies for classification purposes is further illustratively described in the U.S. patent application Ser. No. 08/907,145 by Safdar M. Asghar and Lin Cong entitled "Robust Speech Parameters In A Robust Speech Recognition System", which is hereby incorporated by reference in its entirety.

To utilize input signal 304 energy distinctions and typical noise energy characteristics, each frame of input signal 304 is processed in LPC and energy parameters operation 316 to also determine the respective energy, $E_y$, in the yth frame, y=1, 2, ... TO, during the 20 msec time interval of $t_a$ to $t_{a+2}$, where $E_y$ is defined as:

$$E_y = \sum_{n=0}^{N} |(s(n)_y)|^2,$$

where $s(n)_y$ is the sampled input signal of the yth frame, and N equals the number of samples in the yth frame defined by the time interval $t_a$ to $t_{a+2}$, which equals 160 when input signal 304 is sampled at 8 ksamples/sec.

Input signal 304 generally represents a speech signal word which may be corrupted by an acoustic noise signal. To decrease the amount of data used to represent the energy signature of each input signal 304, $E_y$ for each frame is normalized using the frame of input signal 304 having the maximum energy, $E_{max}$, i.e.

$$E_{y,norm} = \frac{E_y}{E_{max}}, \quad y = 1, 2, \ldots, TO.$$

To further reduce the amount of data used to represent each input signal 304 energy signature while maintaining sufficient resolution to distinguish between different input signals, the logarithm of $E_{y,norm}$, is determined in LPC and energy parameters operation 316. Log $E_{y,norm}$ for each frame may be used during training and during recognition as a parameter in the quantization process.

In some environments, such as an automobile environment, noise signals are generally predictable or may be dynamically determined and occupy a low frequency spectral region. In the sampling window defined by the time interval $t_a$ to $t_{a+2}$, the rate of change of the noise signal from frame to frame is small when $t_{a+1}$ minus $t_a$ is relatively small. Additionally, overlapping of successive frames effectively decreases the frame time interval from $t_{a+2}-t_a$ to $t_{a+1}-t_a$ for purposes of determining frame-to-frame energy changes. Frame times may vary inversely to the noise signal frequency and processing performance. Thus, when input signal 304 is corrupted by a noise signal, taking the first derivative of each frame of input signal 304 in LPC and energy parameters operation 316 aids in suppressing the impact of any noise signal. The energy of the first derivative, $E'_y$, of each frame of the input signal is defined as, $$E'_y = (E_y)' = E_y - E_{y-1},$$

where $E_y$ is the original energy of the yth frame, y=1, 2, ..., TO, and $E_{y-1}$ is the original energy of the preceding (y−1)th frame. For y=1, $E_{y-1}$ is zero. As with the original input signal 304, the first derivative energy data, $E'_y$, may be reduced for input signal 304 while maintaining sufficient resolution by utilizing the first derivative of $E_{y,norm}$ to generate normalized first derivative energy parameters, $E'_{y,norm}$. Furthermore, the data may be reduced in LPC and energy parameters operation 316 further for efficient processing by determining the logarithm of $E'_{y,norm}$, and also using log $E'_{y,norm}$ as a parameter in the quantization process to suppress the impact of low frequency noise.

Additionally, in LPC and energy parameters operation 316, the second derivative of the energy, $E''_y$, in each frame of input signal 304 is also determined and defined as, $$E''_y = (E_y')' = E'_y - E'_{y-1},$$

where $E_y'$ is the first derivative of the original energy $E_y$ of the yth frame, y=1, 2, . . . , TO, and $E_{y-1}$ is the first derivative of energy of the preceding (v−1)th frame. For y=1, $E'_y$ is zero. As with the original input signal 304 and the first derivative energy data, the second derivative energy data, $E''_y$, y=1, 2, . . . , TO, may be reduced for input signal 304 while maintaining sufficient resolution by utilizing the first derivative of the normalized first derivative energy parameter, $E'_{y,norm}$ to generate normalized second derivative energy parameters, $EB''_{y,norm}$. Furthermore, the data may again be reduced further by determining the logarithm of log $E''_{y,norm}$, and log $E''_{y,norm}$ may also be used as a parameter in the quantization process.

The training process continues with LSP operation 318 generating, in a well-known manner, LSP frequencies from the respective LPC coefficients. LSP coefficients are, thus, generated for each input signal 304 frame for all q SNR levels from the LPC coefficients. The LSP representations of input signal 304 are used to define a spectral envelope, and they provide a robust representation of the speech short-term magnitude spectral envelope of input signal 304. Band limited input distortion affects only a subset of LSP coefficients, as compared to the case of a cepstral representation where input noise corrupts all the coefficients. Additionally, LSP parameters have both well-behaved dynamic range and filter stability preservation properties and can be coded more efficiently than other parameters. As a result, the LSP representation can lead to a 25–30% bit-rate reduction in coding the filter (vocal tract) information, as compared to the cepstral coefficient representation. Furthermore, spectral LSP sensitivities are localized, i.e., a change in a given LSP produces a change in the LP power spectrum only in its neighborhood frequencies. For example, a change in an LSP from 1285 Hz to 1310 Hz affects the LP power spectrum near 1300 Hz. This is particularly useful when speech is corrupted by narrow band noise in which case only a subset of LSP parameters are affected by the input noise.

In general given a short segment of input signal 304 and the corresponding allpole filter H(z)=G/A(z), where A(z) is the inverse filter given by $$A(z) = 1 + a_1 z^{-1} + a_2 z^{-2} + \ldots + a_p z^{-D}$$

where D is the order of the predictor and $\{a_i\}$ are the prediction coefficients, the LSPs are defined by decomposing the inverse filter polynomial into two polynomials, $$P(z) = A(z) + z^{-(D+1)} A(z^{-1}),$$

and $$Q(z) = A(z) - z^{-(D+1)} A(z^{-1}),$$

where P(z) is a symmetric polynomial, Q(z) is an anti-symmetric polynomial and $$A(z) = \frac{1}{2}[P(z) + Q(z)].$$

The roots of the polynomials P(z) and Q(z) define the LSP frequencies (coefficients).

Each of the uS matrix codebooks 310 contains a subset s, s=1, 2, . . . , S, of the parameters used to characterize input signal 304. In one embodiment of speech recognition system 300, S equals two and each of the $u_1$ matrix codebooks 310 contain the first through sixth order LSP parameters of each input signal 304 frame which are the primary LSP parameters affected by acoustic noise. The remaining $u_2$ matrix codebooks 310 contain the remaining orders of LSP parameters, for example, the sixth through twelfth order LSP parameters of each input signal 304 frame. In one embodiment, the matrices of uS matrix codebooks 310 are constructed such that each of the S submatrices contains consecutive rows of input signal 304 parametric data.

Likewise, each of the uS vector codebooks 312 contains a subset s, s=1, 2, . . . , S, of the parameters used to characterize input signal 304. In one embodiment of speech recognition system 300, S equals two and each of the $u_1$ vector codebooks 312 contain the first through sixth order LSP parameters of each input signal 304 frame which are the primary LSP parameters affected by acoustic noise. The remaining $u_2$ vector codebooks 312 contain the remaining orders of LSP parameters, for example, the sixth through twelfth order LSP parameters of each input signal 304 frame. In one embodiment, the vectors of uS vector codebooks 312 are constructed such that each of the S subvectors contains consecutive input signal 304 parametric data.

Each of the uS matrix codebooks 310 for a given vocabulary word is designed by developing a matrix entry from each of the qr entries for a corresponding input signal 304 vocabulary word $W_{nhm}$, n=1, 2, . . . u, h=1, 2, . . . , q, m=1, 2, . . . , r, from the database of uqr words. The qr matrix entries for each of the u vocabulary words at each of the q SNR levels are processed to optimally cluster each of the qr entries for each of the uS matrix codebooks 310 into $C_s$ cells. Each of the uS vector codebooks 312 for a given vocabulary word is designed by developing a vector entry from each of the qr entries for a corresponding input signal 304 word $W_{nhm}$, n=1, 2, . . . , u, h=1, 2, . . . , q, m=1, 2, . . . , r, from the database of uqr words. The qr vector entries for each of the u words at each of the q SNR levels are processed to optimally cluster each of the qr entries for each of the uS vector codebooks 312 into $C_s$ cells. Note that, $C_s$ for FSMQ 308 may be different or identical to $C_s$ for FSVQ 306.

A centroid is computed for each of the $C_s$ cells for each of the uS matrix codebooks 310 and uS vector codebooks 312, respectively, for minimum quantization distortion using, for example, a Fuzzy C-algorithm or a fuzzy Linde-Buzo-Gray (LBG) algorithm as illustratively discussed in chapter 3 of the L. Cong thesis and further illustratively discussed in C. S. Xydeas and Lin Cong, "Robust Speech Recognition Using Fuzzy Matrix Quantisation, Neural Networks and Hidden Markov Models", pp.1587–1590, EUSIPCO-96, Vol. 1, September, 1996, which is also incorporated by reference in its entirety. Note that $C_s$ for FSMQ 308 may be different or identical to $C_s$ for FSVQ 306.

To reduce demands on processing resources, each of the uS matrix codebooks 310 may be used to design a single matrix codebook 320 by combining the respective $C_s$ codewords, s=1, 2, . . . , S, of each of the uS matrix codebooks 310 into u times C centroids of the single matrix codebook 320, $C=(C_1+C_2+\ldots+C_S)$, where $C_s$ is the number of codewords in the sth matrix codebook. The individual codewords are preferably unaltered after combining. 'Cu' may be chosen to accommodate available speech recognition system 300 resources and is, for example, equal to the training vocabulary word size times 32. Additionally, each of the uS vector codebooks 312 is used to design a single vector codebook 322 by combining the respective $C_s$, s=1, 2, ..., S, codewords of each of the uS vector codebooks 312 into u times C of the single vector codebook 322, C=($C_1$+$C_2$+...+$C_S$), where $C_s$ is the number of codewords in the sth vector codebook, and $C_s$ may vary between all vector and matrix codebooks to reduce quantization. The individual centroids are preferably unaltered after combining. Cu may be chosen to accommodate available speech recognition system 300 resources and is, for example, also equal to the training vocabulary word size times 32. Additionally, "S" may be different or identical for uS matrix codebooks 310 and uS vector codebooks 312.

FSMQ 308 utilizes interframe information related to the "evolution" of the speech short-term spectral envelopes input signal energy parameters of acoustic signal 304 by operating on N consecutive, overlapping speech frames of acoustic signal 304 (FIG. 4). FSVQ 306 is a special case of FSMQ 308 where N is set to one, and, thus, FSVQ 306 operates within the frequency domain and not the time domain. Each frame of input signal 304 is represented by D LSP coefficients, and, thus, an N frames input signal segment provides a P×N matrix of LSP coefficients which is split into S submatrices for FSMQ 308, and each frame of input signal 304 provides a P dimension vector which is split into S subvectors for FSVQ 306, where S is less than or equal to P. Each frame of input signal 304 is also represented by the three energy parameters, log $E_{y,norm}$, log $E'_{y,norm}$, and log $E''_{y,norm}$, and, thus, the N frame's input signal segment provides an additional 3×N matrix of energy parameters for FSMQ 308 and provides three additional dimensions to form a D+3 dimensions vector for FSVQ 306. Each matrix entry for FSMQ 308 and vector entry for FSVQ 306 for an input signal 304 word $W_{nhm}$ may be designed using a training set of TO input signal spectral and energy parameter vectors respectively derived from each of the TO frames of each acoustic signal 304 word $W_{nhm}$. Thus, a set X={$X_1$, $X_2$, ..., $X_T$} of T (D+3)×N matrices for FSMQ 308 and T D+3 dimension vectors for FSVQ 306 for each acoustic signal 304 word $W_{nhm}$ results, where T=int(TO/N) and $x_k$ has the general form of:

$$x_k = \begin{bmatrix} x^k_{11} & x^k_{12} & \cdots & x^k_{1N} \\ x^k_{21} & x^k_{22} & \cdots & x^k_{2N} \\ \cdots & \cdots & \cdots & \cdots \\ x^k_{P1} & x^k_{P2} & \cdots & x^k_{PN} \end{bmatrix} = \begin{bmatrix} \hat{x}_{1k}(m_1) \\ \hat{x}_{2k}(m_2) \\ \cdots \\ \hat{x}S_k(mS) \end{bmatrix}$$

where $\hat{x}_{sk}(m_s)$, k=1, 2, ..., T, is formed by $m_s$ adjacent rows, s=2, ..., S and is the sth submatrix for FSMQ 308 and sth subvector with N equal to one for FSVQ 306. The first D entries of the ith column vector are the first through Dth LSP spectral coefficients, respectively, and the last three parameters (D+1 through D+3) are log $E_{y,norm}$, log $E'_{y,norm}$, and log $EB''_{y,norm}$, respectively. Notice that $$\sum_{s=1}^{S} m_s = P$$

=P and $m_0$=0. Thus $$\hat{x}_{sk}(m_s) = \begin{bmatrix} x^k_{p+1,1} & x^k_{p+1,2} & \cdots & x^k_{p+1,N} \\ x^k_{p+2,1} & x^k_{p+2,2} & \cdots & x^k_{p+2,N} \\ \cdots & \cdots & \cdots & \cdots \\ x^k_{p+m_s,1} & x^k_{p+m_s,2} & \cdots & x^k_{p+m_s,N} \end{bmatrix}$$

$$= [\bar{x}^k_{s1}, \bar{x}^k_{s2}, \ldots, \bar{x}^k_{sN}]$$

where $p = \sum_{s=0}^{s-1} m_s$.

In one embodiment of speech recognition system 300, the total number of rows in $X_k$ is P, and P equals D +3, where "3" is the number of energy parameters used in the characterization of each frame of input signal 304 and "D" represents, for example, twelve consecutive orders of LSP frequency coefficients. S is, for example, selected to be two (2) to 'split' out the first six orders of LSP frequency coefficients where acoustic noise corruption is most prevalent from the fifteen total input signal 304 parameters. Thus, for $\hat{x}_{1k}(m_1)$, $m_1$ equals six and p=0. For $\hat{x}_{2k}(m_2)$, $m_2$ equals nine and p=6.

Each of the xsk(ms) entries includes j columns,j=1, 2, ..., N. FSMQ 308 operates on time domain aspects of N frames of input signal 304, where N is greater than one and is, for example, two. FSVQ 306 is a special case of FSMQ 308 where j=N=1, and, thus, for FSVQ 306, $\hat{x}_{sk}(m_s)$ are vector entries. Thus, each of the uS matrix codebooks has rq times T $\hat{x}_{sk}(m_s)$ matrix entries, where the matrix entries for the nth vocabulary word are stored in the nth codebook, n=1, 2, ..., u. The u1 matrix codebooks containing the $\hat{x}_{1k}(m_1)$ matrix entries, and the u2 matrix codebooks containing the $\hat{x}_2k(m_2)$ matrix entries. The u1 vector codebooks containing the $\hat{x}_{1k(m1)}$ vector entries, and the u2 vector codebooks containing the $\hat{x}_2k(m_2)$ vector entries.

Each set of T $\hat{x}_{sk}(m_s)$, s=1, 2, ..., S, submatrices ("$X_{MS}$") for FSMQ 308 and subvectors ("$X_{VS}$") for the FSVQ 306, is processed, using, for example, the LBG algorithm, to yield respective $C_s$-cell $A_i^s$, i=1, 2, ..., $C_s$ partitions of the s-submatrix space and thus produces a $C_s$ entries codebook containing $v_i^s$, i=1, 2, ..., $C_s$, $m_s$×N centroids:

$$v_i^s = \begin{bmatrix} v^i_{p+1,1} & v^i_{p+1,2} & \cdots & v^i_{p+1,N} \\ v^i_{p+2,1} & v^i_{p+2,2} & \cdots & v^i_{p+2,N} \\ \cdots & \cdots & \cdots & \cdots \\ v^i_{p+m_s,1} & v^i_{p+m_s,2} & \cdots & v^i_{p+m_s,N} \end{bmatrix}$$

$$= [\bar{v}^i_{s1}, \bar{v}^i_{s2}, \ldots, \bar{v}^i_{sN}]$$

where N is greater than one for uS matrix codebooks 310 and equals one for uS vector codebooks 312. The uS vector codebooks 312 and uS matrix codebooks 310 are processed using, for example, the LBG algorithm to obtain the minimum overall distortion between the training data base input signal 304 words and centroids using, for example, the distortion equations and distance measures described herein in conjunction with quantization and also as described in chapter 3of the L. Cong thesis.

Each of the $C_s$ codeword entries, $v_i^s$, for each of the uS matrix codebooks 310 may be combined as described above to form the single matrix codebook 320 having Cu codeword centroid matrices, $v_{Mi}$, i=1, 2, ..., Cu, with C centroid codewords per vocabulary word, C=($C_1$+$C_2$+...+$C_S$). Also, each of the C, codeword entries, $v_i^s$, for each of the uS vector codebooks 312 may be combined as described above to form the single vector codebook 322 having Cu codeword centroid vectors, $v_{vi}$, i=1, 2, ..., Cu, with C centroid codewords per vocabulary word, $C=(C_1+C_2+...+C_S)$.

During split matrix and split vector quantization, a distance measure is determined between predetermined codeword parameters and input signal parameters. The input signal 304 is quantized by associating the input signal 304 parameters to parameters of a single codeword in respective split matrix and split vector quantizers when making a 'hard' decision. When using a fuzzy decision process, the input signal 304 is quantized to parameters of multiple codewords in the FSVQ 306 and FSMQ 308, respectively, using a weighted degree of closeness. The type of parameters used to represent input signals and the codewords in respective single split vector codebook 322 and single split matrix codebook 320 and the distance measure algorithm employed play an important role in recognition (classification) accuracy, especially in acoustically noisy environments.

In different environments, speech is corrupted by acoustic noise of varying frequency. However, in some environments, the frequency bands occupied by noise signals can be generally predictable. For example, in an automotive environment, a large portion of acoustic noise energy is concentrated in the low frequency 300–400 Hz range which can particularly corrupt male voices. Additionally, car noise energy is generally predictable at different operating speeds. Thus, the peak of the noise spectra in an automotive environment is substantially located in generally predictable low frequencies. The noise spectrum then decreases exponentially as frequencies increase until after about 4 kHz the acoustic noise energy is very low. Through analyzing the effect of the automotive noise on LSP speech parameters, we found that the power of the car noise affects low order LSP parameters more than the high order LSP parameters.

A distance measure between the input signal 304 spectral frequencies and codeword spectral frequencies may be manipulated to further compensate for noise corruption. More specifically, noise compensation error factors may be computed using an error power spectrum of an input signal and a predicted input signal. The noise to be compensated for may be known, for example, from knowledge of a specific operating environment or may be dynamically determined. The error factors may be used to appropriately shift and weight each of the ith input signal and codeword spectral frequencies to compensate for noise corruption. Thus, when the energy parameters are combined with other signal parameters, such as line spectral pair coefficients, recognition accuracy may be enhanced. Exemplary distance measures and algorithms are described below and illustratively described in chapter 3 of the L. Cong thesis and in Asghar and Cong, "Robust Distance Measure".

One exemplary robust LSP distance measure, $d(f, \hat{f})$, is computed by FSVQ 306 and FSMQ 308 to address noise frequency distribution. The distance measure $d(f, \hat{f})$ between LSP coefficients of vector $f$, formed from LSP coefficients in LSP operation 318 from input signal 304, and LSP coefficients of a reference vector $\hat{f}$, which is a vector centroid in single split vector codebook 322 and vector entries of a matrix codebook centroid matrix in single split matrix codebook 320, is given by:

$$d(f, \hat{f}) = \sum_{i=1}^{mI} \alpha_1 \left[ (f_i - e_i^{b_1} - \hat{f}_i) \right]^2 + \quad [1]$$

$$\sum_{i=mI+1}^{m2} \alpha_2 \left[ (f_i - \hat{f}_i) e_i^{b_2} \right]^2 +$$

$$\sum_{i=D+1}^{P} \alpha_3 \left[ E_i - \hat{E}_i \right]^2,$$

where $f_i$ and $\hat{f}_i$ are the ith LSP in the input signal and codeword vector, respectively. The constants $\alpha_1$, $\alpha_2$, $\beta_1$ and $\beta_2$ are experimentally determined to minimize quantization error. For the automotive noise environment studied, $\alpha_1$ is set to 1.6, $\alpha_2$ is set to 0.68, $\beta_1$ is set to 0.5, and $\beta_2$ is set to 0.25. $E_i$ and $\hat{E}i$ for i=D+1 to D+3 represent the energy (i=D+1), first derivative of the energy (i=D+2), and second derivative of the energy (i=D+3), of the input signal 304 and codeword vector, respectively. $\alpha_3$ is experimentally determined and is, for example, 100. When noise amplitude is large, the quantization errors of FSVQ 306 and FSMQ 308 may also be large. Thus, when speech is corrupted by car noise, the frequency shift for the first m1 order LSP coefficients can compensate the car noise effect at low LSP frequencies and the frequency weight can compensate the m1+1 to D order coefficients at high LSP frequencies to reduce quantization error, where m1 is the number of parameters in the first split matrix s=1. Reducing quantization error improves the recognition accuracy of speech recognition system 300.

The error $e_i$ is the weight and frequency shift for the ith LSP and is given by the LPC error power spectrum at the different test LSP frequencies. Input signal 304 is sampled at a rate of n samples per second, and one frame of input signal 304 is represented by input signal 304 s(n) and an error, e(n), between the input signal 304 s(n) and a predicted input signal 304, $\hat{s}(n)$, as defined by $$e(n) = s(n) - \hat{s}(n) = s(n) - \sum_{k=i}^{P} \alpha_k s(n-k)$$

where $\alpha_k$ are prediction coefficients and are selected to minimize the total squared prediction error defined by the energy E(n) of e(n):

$$E_n = \sum_m e^2(m) = \sum_m [s_n(m) - \hat{s}_n(m)]^2$$

and can be found by setting $\partial E_n / \partial \alpha_i = 0$, for i=1, 2, ..., D.

A discrete Fourier transform of e(n) yields: $|E(e^{j2\pi f i})|^2$, i=1,2,...,P which is the spectrum associated with the input signal 304 represented by D order LSPs as a function of LSP frequencies. Thus, the error $e_i$ is defined as:

$$e_i = |E(e^{j2\pi f i})|^2,$$

where $f_i$ is the ith LSP frequency of the input signal 304.

The shifted frequencies are the frequencies at which noise energy is primarily concentrated. Noise energy concentrations may be dynamically detected using a noise detector (not shown) or may be predetermined based on knowledge of a known user environment. Additionally, in some operating environments, such as in a car, noise changes according to traveling speed. The speed can be detected and a database of predicted noise energy frequency concentration may be accessed by a processor (not shown) to dynamically adjust the error compensation of the robust distance measure.

In another embodiment, the robust LSP distance measure, d($f$, $\hat{f}$), is given by:

$$d(f, \hat{f}) = \sum_{i=1}^{mI} \left[(f_i - \hat{f}_i)e_i^{b^I}\right]^2 + \sum_{i=mI+1}^{D} \left[(f_i - \hat{f}_i)\right]^2 + \sum_{i=D+1}^{P} \alpha_3 [E_i - \hat{E}_i]^2, \quad [2]$$

where the error signal $e_i$ is utilized to enhance processing of only the parameters within the first split matrix for FSMQ 308 and the first split vector for FSVQ 306. Alternatively, the error signal ei may be used to enhance processing of the first parameters within the first split matrix for FSMQ 308 and the first split vector for FSVQ 306 by shifting the frequency differences as in equation [1]. Selective enhanced processing allows for more efficient use of available processing resources. Various other variations of selective enhanced distance measure processing will be evident to persons of ordinary skill in the art.

Continuing the training process of speech recognition system 300, each of the training database entries in the urq training word database are again provided as a respective training input signal 304 to speech recognition system 300. Each input signal 304 word $W_{nhm}$ is preprocessed by preprocess operation 312, and LPC coefficients and energy parameters log $E_{y,norm}$, log $E'_{y,norm}$, and log $E''_{y,norm}$ are derived in LPC and energy parameters operation 316 from each frame of input signal 304 as described above. Each of the LPC coefficients is converted into D respective LSP frequencies by LSP operation 318. Each of the input signal 304 training words $W_{nhm}$ is again represented by a respective set of the TO speech spectral vectors for each frame of each input signal 304 word $W_{nhm}$, which result in the set $X = \{x_1, x_2, \ldots, x_T\}$ of T, where again $$x_k = \begin{bmatrix} \hat{x}_{1k}(m_1) \\ \hat{x}_{2k}(m_2) \\ \ldots \\ \hat{x}S_k(mS) \end{bmatrix}, k = 1, 2, \ldots, T,$$

and the number of columns j in each of $\hat{x}_{sk}(m_s)$ equals N, and N is greater than one for FSMQ 308 and equals one for FSVQ 306.

The respective fuzzy split vector and split matrix quantization of each of the training words $W_{nhm}$, using the single split vector codebook 322 and single split matrix codebook 320, respectively, are described by S respective $C_s u \times T$ fuzzy classification matrices $U_{sVF}$ and $U_{sMF}$, each with respective elements $u^F_{iks} \in [0,1]$, $i=1,2,\ldots,C_s u$, $k=1,2,\ldots,T$. The value of $u^F_{iks}$, $0 \leq u^F_{iks} \leq 1$, indicates the degree of fuzziness of the kth input matrix $x_k$ to the ith partitioning cell which is represented by the centroid vectors $v_{Vi}$ and centroid matrices $v_{Mi}$, for FSVQ 306 and FSMQ 308, respectively.

The S fuzzy classification matrices $U_{sVF}$ and $U_{sMF}$ are defined generally as:

$$U_{1BF} = \begin{bmatrix} u^F_{111} & u^F_{121} & \cdots & u^F_{1T1} \\ u^F_{211} & u^F_{221} & \cdots & u^F_{2T1} \\ \cdots & \cdots & \cdots & \cdots \\ u^F_{C_1 11} & u^F_{C_1 21} & \cdots & u^F_{C_1 T1} \end{bmatrix} \quad \begin{array}{cccc} O_{11} & O_{21} & \cdots & O_{T1} \end{array}$$

$$U_{2BF} = \begin{bmatrix} u^F_{112} & u^F_{122} & \cdots & u^F_{1T2} \\ u^F_{212} & u^F_{222} & \cdots & u^F_{2T2} \\ \cdots & \cdots & \cdots & \cdots \\ u^F_{C_2 12} & u^F_{C_2 22} & \cdots & u^F_{C_2 T2} \end{bmatrix} \quad \begin{array}{cccc} O_{12} & O_{22} & \cdots & O_{T2} \end{array}$$

$$U_{SBF} = \begin{bmatrix} u^F_{11S} & u^F_{12S} & \cdots & u^F_{1TS} \\ u^F_{21S} & u^F_{22S} & \cdots & u^F_{2TS} \\ \cdots & \cdots & \cdots & \cdots \\ u^F_{C_S 1S} & u^F_{C_S 2S} & \cdots & u^F_{C_S TS} \end{bmatrix}, \quad \begin{array}{cccc} O_{1S} & O_{2S} & \cdots & O_{TS} \end{array}$$

where 'B' represents 'M' for FSMQ 308 and 'V' for FSVQ 306. Two conditions are also satisfied:

$$\sum_{i=1}^{C_s u} u^F_{iks} = 1 \quad \text{and} \quad \sum_{k=1}^{T} u^F_{iks} > 0$$

In this case, $u^F_{ik}$ is derived as:

$$u^F_{iks} = \frac{1}{\sum_{j=1}^{C_s u} \left( \frac{d_{ik}(\hat{x}_{sk}, v^s_{Bi})}{d_{jk}(\hat{x}_{sk}, v^s_{Bj})} \right)^{\frac{1}{(F-1)}}}.$$

where the constant F influences the degree of fuzziness for F>1, and B represents V for FSVQ 306 and M for FSMQ 308. $\hat{x}_{sk}$ represents all subvectors $\hat{x}_{sk}(m_s)$ for FSVQ 306 and all submatrices $\hat{x}_{sk}(m_s)$ for FSMQ 308.

The respective columns $O_{ks}$ of the classification matrices $U_{sVF}$ and $U_{smF}$ "map" input signal 304 entries $\hat{x}_{sk}$ to $v_{Vis}$ and $v_{Mis}$, respectively, where $\hat{x}_{sk}$ represents subvectors for FSVQ 306 and submatrices for FSMQ 308 The distance between columns $O_{ks} = \{u_{1ks}, u_{2ks}, \ldots, u_{c_s ks}\}$ and the respective FSVQ 306 and FSMQ 308 centroid matrices $v^s_{Bi}$ is:

$$J(O_{ks}, V_{Bs}) = \sum_{i=1}^{C_s u} u^F_{iks} d(\hat{x}_{sk}, v^s_{Bi}),$$

where B represents 'V' for FSVQ 306 and 'M' for FSMQ 308, and $V_{Ms}$ represents the set of single split matrix codebook 320 centroids and $V_{Vs}$ represents the set of single split vector codebook 322 centroids.

Furthermore, the overall distortion of the $C_s u$ centroid entries of FSVQ 306 and FSMQ 308 when operating on the $X_{Ms}$ sub-matrix set and $X_{Vs}$, respectively, is $$J(U_{Bs}, V_{Bs}) = \sum_{k=1}^{T} \sum_{i=1}^{C_s u} u_{iks}^F d(\hat{x}_{sk}, v_{Bi}^s).$$

Note that the summation of the $O_{ks}$ components is equal to unity. The largest $u_{iks}^F$ component is the one which corresponds to the cell (centroid) with the smallest $d(\hat{x}_{sk}, v_{Bi}^s)$ value. $O_{ks}$ can be interpreted as a probability mass matrix relating the input signal 304 representative matrices $\hat{x}_{sk}$ for FSMQ 308 and input signal 304 representative vectors for FSVQ 306 to all $v_i^s$, i=1, 2, . . . , $C_s$, matrix and vector codewords, respectively. The total observation sequence $O_{WB}$ of probability mass vectors for each input signal 304 word W for the single split matrix codebook 320, when B represents M, and for single split vector codebook 322, when B represents V, is defined as $O_{WB} = \{\{O_{11}, O_{12}, \ldots, O_{1S}\}, \{O_{21}, O_{22}, \ldots, O_{2S}\}, \ldots, \{O_{T1}, O_{T2}, \ldots, O_{TS}\}\}$, $O_{ks} = \{u_{1ks}^F, u_{2ks}^F, \ldots, u_{c_s ks}^F\}$, where n=1, 2, . . . , u. Also, $$d(\hat{x}_{sk}, v_i^s) = \frac{1}{N} \sum_{n=1}^{N} d(\overline{x}_{sn}^k, \overline{v}_{sn}^i),$$

$$d(\overline{x}_{sn}^k, \overline{v}_{sn}^i) = \sum_{m=1}^{m_s} [(x_{p+m,n}^k - v_{p+m,n}^i)(e_i^{B/I})]^2 \quad 1 \leq n \leq N, s=1,$$

$$d(\overline{x}_{sn}^k, \overline{v}_{sn}^i) = \sum_{m=ml+1}^{P} [(x_{p+m,n}^k - v_{p+m,n}^i)]^2 \quad 1 \leq n \leq N, s=2,$$

$$\overline{x}_{sn}^j = [x_{p+1,n}^j, x_{p+2,n}^j, \ldots, x_{p+m_s,n}^j]^T,$$

$$\overline{v}_{sn}^i = [v_{p+1,n}^j, v_{p+2,n}^i, \ldots, v_{p+m_s,n}^i]^T, \text{ and}$$

$$v_i^s = \frac{\sum_{k=1}^{T} u_{ijs}^F \hat{x}_{sj}}{\sum_{k=1}^{T} u_{ijs}^F} \quad 1 \leq i \leq C_s$$

where N=1 for FSVQ 306 and N is equal to the number of columns of $\hat{x}_{sk}$ for FSMQ 308. Note that $e_i$ serves as an enhanced processing factor for the distance measure of split entries, s=1, for FSVQ 306 and FSMQ 308. It will be recognized by persons of ordinary skill in the art that the equations may be modified to accommodate enhanced or simplified processing for any number of split matrices or split vectors and targeted to any particular one or ones of split matrices or split vectors. By targeting particular parameters for enhanced processing and simplified processing, processing resources are used efficiently and execution time may decrease while achieving good speech recognition accuracy.

By combining all $v_i^s$ subcodebooks together, the centroid of matrix $v_i$ is:

$$v_i = [v_i^1, v_i^2, \ldots, v_i^S]^T.$$

The general distortion equation is:

$$J(W, V) = \sum_{j=1}^{T} \sum_{i=1}^{C_s u} w_{ijs} d(\hat{x}_{sj}, v_i^s)$$

with $$W_{ijs} = \begin{cases} u_{iks} & u_{iks} \in \{0, 1\}, \text{ (hard decision process)} \\ u_{iks}^F & u_{iks} \in [0, 1], \text{ (fuzzy decision process)}. \end{cases}$$

Furthermore, the overall distortion of the for all of the codeword entries in the FSVQ 306 and FSMQ 308 while operating on the complete X matrix set is $$J(U_B, V_B) = \sum_{s=1}^{S} \sum_{k=1}^{T} \sum_{i=1}^{C_s u} u_{iks}^F d(\hat{x}_{sk}, v_{Bi}^s)$$

Split vector and split matrix design and quantization are further illustratively described in chapter 3 of the L. Cong thesis. Hard decision split vector and split matrix quantization be used to quantize input signal 304 and is illustratively discussed in chapter 3 of the L. Cong thesis.

During the training mode of speech recognition system 300, the training input data for the hidden Markov models of classifier HMM $\lambda_{Vn}$, n=1, 2, . . . , u, are in one embodiment the observation sequences $O_{Vn}$ of probability mass vectors $O_{Vk}$ from classification matrices $U_{Vs}$, s=1, 2, . . . , S. The classification matrices $U_{Vs}$ are generated by FSVQ 306 from a fuzzy split vector quantized input signal 304 for each of the training words $W_{nhm}$ as described above. Each of the respective u vocabulary words for each repetition r and SNR levels q is, in one embodiment, fuzzy vector quantized to train a corresponding HMM $\lambda_{Vn}$ process. Each of the observation sequences $O_{Vn}$ from FSVQ 306 for each of the urq training words train corresponding HMM $\lambda_{Vn}$ processes, i.e. for an nth vocabulary word, an input observation sequence $O_{Vn}$ trains only the nth HMM $\lambda_{Vn}$. Separate HMM $\lambda_{Vn}$'S may be built for males and females, and the number of states of each HMM $\lambda_{Vn}$ is set to, for example, five. HMM $\lambda_{Vn}$ training is further described in chapters 2 and 4 of the L. Cong thesis.

Likewise, during the training mode of speech recognition system 300, the training input data for the hidden Markov models of classifier HMM $\lambda_{Mn}$, n=1, 2, . . . , u, are in one embodiment the observation sequences $O_{Mn}$ of probability mass vectors $O_{Mk}$ from classification matrices $U_{Ms}$, s=1, 2, . . . , S. The classification matrices $U_{Ms}$ are generated by FSMQ 308 from a fuzzy matrix quantized input signal 304 for each of the training words $W_{nhm}$ as described above. Each of the respective u vocabulary words for each repetition r and SNR levels q is, in one embodiment, fuzzy matrix quantized to train a corresponding HMM $\lambda_{Mn}$ process. Each of the observation sequences $O_{Mn}$ from FSMQ 308 for each of the urq training words train corresponding HMM $\lambda_{Mn}$ processes, i.e. for an nth vocabulary word, an input observation sequence $O_{Mn}$ trains only the nth HMM $\lambda_{Mn}$. Separate HMM $\lambda_{Mn}$'s may be built for males and females, and the number of states of each HMM $\lambda_{Mn}$ is set to, for example, five. HMM $\lambda_{Mn}$ training is further described in chapters 2 and 4 of the L. Cong thesis.

After training the speech recognition system 300, paths 2 are selected for entry into the recognition process. When any input signal 304 word $W_n$ is spoken by a user, VAD 314 effectively defines end points of input words for IWSR. Speech input signal 304 word $W_n$ is next preprocessed by preprocess operation 312 as described above. Word $W_n$ is sampled at, for example, 8 ksamples/sec, and segmented into TO frames of t seconds each, such as t equal to 20 msec with a 10 msec overlap of each consecutive frame of $W_n$. Energy coefficients operation 315 generates the log $E_{y,norm}$, log $E'_{y,norm}$, and log $E''_{y,norm}$ energy coefficients. LPC and energy parameters operation 316 generates D LPC coefficients for each frame of the $W_n$, and LSP operation 332 generates Dth order LSP coefficients from the LPC coefficients as described above.

Each frame of input signal 304 is again represented by D order LSP coefficients and the three energy parameters, log $E_{y,norm}$, log $E'_{y,norm}$ and log $E''_{y,norm}$, and T $\hat{x}_{sk}(m_s)$, s=1, 2, . . . , S, submatrices ("$X_{M_s}$") for FSMQ 308 and subvectors ("$X_{V_s}$") for the FSVQ 306.

FSVQ 306 fuzzy vector quantizes the split vector representation $X_{V_{sn}}$, s=1, 2, . . . , S, of word W with the designed Cu, C=($C_1$+$C_2$+. . . +$C_S$), codeword entries of the single split vector codebook 322. Single split vector codebook 322 yields the observation sequence $O_{VW}$ as described above. Observation sequence $O_{VW}$ is used as input data by a flizzy Viterbi algorithm 324 operating on each of the HMM $\lambda_{Vn}$ processes, n=1, 2, . . . , u. Fuzzy Viterbi algorithm operation 324, described in chapter 4 of L. Cong, "A Study of Robust IWSR Systems" utilizes a respective observation sequence Ovw from each of the rq versions of each of the u words and fizzy Viterbi algorithm 324 to produce a maximum likelihood probability $Pr(O_{Vn}|\lambda_{VW})$, n=1, 2, . . . , u of the HMM $\lambda_{Vn}$ process producing the observation sequence $O_{VW}$. The u probability data outputs of the fuzzy Viterbi algorithm 324 are the respective maximum likelihood probability measures $Pr(O_{VW}|\lambda_{Vn})$ that the HMM $\lambda_{Vn}$ process produced the observation sequence $O_{VW}$, i.e. the maximum likelihood probability that the HMM $\lambda_{Vn}$ process corresponds to $W_n$. Note that $0 \leq Pr(O|\lambda) \leq 1$, and the Viterbi algorithm generally produces a logarithmic probability.

Likewise, FSMQ 308 fuzzy split matrix quantizes the matrix representation $X_{Msn}$, s 1, 2, . . . , S, of word W with the designed Cu, C=($C_1$+$C_2$+. . . +$C_S$), codeword entries of the single split matrix codebook 320. Single split matrix codebook 320 yields the observation sequence $O_{MW}$ as described above. Observation sequence $O_{MW}$ is used as input data by fuzzy Viterbi algorithm 326 operating on each of the HMM $\lambda_{Mn}$ processes, n=1, 2, . . . , u. Fuzzy Viterbi algorithm operation 326, described in chapter 4 of L. Cong, "A Study of Robust IWSR Systems" utilizes a respective observation sequence $O_{MW}$ from each of the rq versions of each of the u words and fuzzy Viterbi algorithm 326 to produce a maximum likelihood probability $Pr(O_{MW}|\lambda_{Mn})$, n=1, 2, . . . , u of the HMM $\lambda_{Mn}$ process producing the observation sequence $O_{MW}$. The u probability data outputs of the fuzzy Viterbi algorithm 326 are the respective maximum likelihood probability measures $Pr(O_{MW}|\lambda_{Mn})$ that the HMM $\lambda_{Mn}$ process produced the observation sequence $O_{MW}$, i.e. the maximum likelihood probability that the HMM $\lambda_{Mn}$ process corresponds to W.

When speech recognition system 300 operates in a recognition mode, the nth probability $Pr(O_{VW}|\lambda_{Mn})$ from HMM $\lambda_{Vn}$ is combined by the hybrid decision generator 328 with the nth $Pr(O_{MW}|\lambda_{Mn})$ from HMM $\lambda_{Mn}$ for n=1, 2, . . . , u to generate FMQ error compensated classification data, D(n) for each of the u vocabulary words of speech recognition system 300, where D(n) is defined in one embodiment as:

$$D(n) = \alpha Pr(O_{MW}|\lambda_{Mn}) + Pr(O_{VW}|\lambda_{Vn}), n=1, 2, \ldots, u.$$

The scaling constant 'α' may be adjusted to maximize recognition accuracy and is, for example, set to two. The input signal 304 is selected by the hybrid decision generator 328 to be the nth word when D(n)=min(D(n)), n=1, 2, . . . , u (note that the Viterbi algorithm internally computes the logarithm of outcome probabilities). Computing resources may be more favorably disposed to computing the logarithm of each D(n) for n=1, 2, . . . , u, obtaining respective absolute values, and selecting the nth word as input signal 304 when D(n)=min(abs(D(n))), n=1, 2, . . . , u. It will be recognized that either or both $Pr(O_{VW}|\lambda_{Mn})$ and $Pr(O_{MW}|\lambda_{Mn})$ may be scaled.

While the invention has been described with respect to the embodiments and variations set forth above, these embodiments and variations are illustrative and the invention is not to be considered limited in scope to these embodiments and variations. For example, it will be recognized that continuous time data and continuous time algorithms may be used in substitution of the discrete time data and discrete time algorithms, respectively. Additionally, other input signal parameter types may be used to characterize input signal 304, and other distance measures may be used. Using continuous time methods will generally increase processing requirements. Also, split HMMs may use respective split matrix observation sequences from FSVQ 306 and respective split matrix observation sequences from FSMQ 308 during training and speech recognition. Furthermore, output data from FSVQ 306 and FSMQ 308 may be combined without using subsequent stage speech classifiers, such as the HMMs, to provide speech recognition. For example, the overall respective distance measures from FSVQ 306 and FSMQ 308 may be combined, with or without weighting, to provide speech recognition. Accordingly, various other embodiments and modifications and improvements not described herein may be within the spirit and scope of the present invention, as defined by the following claims.

What is claimed is:

1. A speech recognition system comprising:
   a split vector quantizer to receive first parameters of an input signal, to partition the first parameters into $S_1$ partitions, and to generate a first quantization observation sequence;
   a first speech classifier to receive the first quantization observation sequence from the split vector quantizer and generate first respective speech classification output data;
   a split matrix quantizer to receive second parameters of the input signal, to partition the second parameters into $S_2$ partitions, and generate a second quantization observation sequence;
   a second speech classifier to receive the second quantization observation sequence from the split matrix quantizer and generate second respective speech classification output data; and
   a hybrid decision generator to combine corresponding first and second respective speech classification data to generate third respective speech classification data and to recognize the input signal from the third respective speech classification data.

2. The speech recognition system as in claim 1 wherein the split vector and split matrix quantizers utilize respective single codebooks.

3. The speech recognition system as in claim 1 wherein the input signal for reception by the split vector quantizer and split matrix quantizer is a spoken word.

4. The speech recognition system as in claim 1 wherein the first parameters of the input signal include the energy of the input signal and first and second derivatives of the input signal energy.

5. The speech recognition system as in claim 1 wherein the split vector and split matrix quantizers utilize fuzzy quantization.

6. The speech recognition system as in claim 1 wherein the first and second speech classifiers are a first and second set, respectively, of hidden Markov models.

7. The speech recognition system as in claim 6 wherein:
the speech recognition system has u vocabulary words, and u is an integer;
the first respective speech classification output data includes probabilities, $\Pr(O_{Vn}|\lambda_{Vn})$, n=1,2, . . . , u, related to respective ones of the first set of n hidden Markov models, $\lambda_{Vn}$, and the first quantization observation, $O_V$, sequence to one of the u vocabulary words, and n is an integer;
the second respective speech classification output data includes probabilities, $\Pr(O_{Mn}|\lambda_{Mn})$, n=1,2, . . . u, related to respective ones of the second set of n hidden Markov models, $\lambda_{Mn}$, and the second quantization observation sequence, $O_{Mn}$, to one of the u vocabulary words, and n is an integer;
the third respective speech classification data is $D(n)=\alpha \Pr(O_{Mn}|\lambda_{Mn})+\Pr(O_{Vn}|\lambda_{Vn})$, n=1, 2, . . . , u and $\alpha$ is a weighting factor; to all $\Pr(O_{Vn}|\lambda_{Vn})$ to compensate for recognition errors in $\Pr(O_{Mn}|\lambda_{Mn})$ and
the hybrid decision generator is further capable of recognizing the input signal as the ith vocabulary word when D(i) represents the highest probability that the input signal is the ith of the u vocabulary words.

8. The speech recognition system as in claim 1 wherein the first parameters of the input signal for reception by the split vector quantizer include P order line spectral pairs of the input signal, and the second parameters of the input signal for reception by the split matrix quantizer include temporally related P order line spectral pairs, wherein P is an integer.

9. The speech recognition system as in claim 8 wherein P equals twelve.

10. The speech recognition system as in claim 1 wherein split vector quantizer is capable of partitioning the first parameters to separate first parameters primarily affected by localized noise from the remaining first parameters, and the split matrix quantizer is capable of partitioning the second parameters to separate second parameters primarily affected by localized noise from the remaining second parameters.

11. The speech recognition system as in claim 10 wherein the first and second parameters include line spectral pair coefficients, $S_1$ and $S_2$ equal two, the first parameters in a first submatrix of the split vector quantizer include the first $N_1$ of P order line spectral pair coefficients, and the second parameters in a first submatrix of the split matrix quantizer include the first $N_1$ of P order line spectral pair coefficients.

12. The speech recognition system as in claim 11 wherein the split vector and split matrix quantizers include respective enhanced distance measures which are capable of operating on the first submatrix of the split vector quantizer and the first submatrix of the split matrix quantizer, respectively.

13. The speech recognition system as in claim 11 wherein the split vector and split matrix quantizers respectively are capable of determining a distance measure between an ith order line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order codeword line spectral pair frequencies and (ii) a weighting of the difference by an ith frequency weighting factor, wherein $N_1$ is greater than or equal to one and less than or equal to P, and P is the highest order line spectral pair frequency of the input signal and codewords.

14. The method as in claim 13 wherein the first distance measures, $d(f,\hat{f})$, between the first parameters of the input signal, $f$, and the reference data parameters, $\hat{f}$, is defined by:

$$d(f,\hat{f}) = \sum_{i=1}^{N_1} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f,\hat{f})$, $f_i$ and $\hat{f}_i$ are the ith line spectral pair frequency parameters in the first parameters of the input signal and the respective first codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the first parameters of the input signal; and
the second distance measures, $d(f,\hat{f})$, between the input signal parameters, $f$, and the reference data parameters, $\hat{f}$, is defined by:

$$d(f,\hat{f}) = \sum_{i=1}^{N_1} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f,\hat{f})$, $f_i$ and $\hat{f}_i$ are the ith line spectral pair frequency parameters in the second parameters of the input signal and the respective second codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the second parameters of the input signal.

15. The speech recognition system as in claim 13 wherein noise frequencies are primarily located in the frequency range represented by line spectral pairs i=1 to $N_1$.

16. The speech recognition system as in claim 11 wherein the split vector and split matrix quantizers respectively are capable of determining a distance measure between an ith line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein $N_1$ is greater than or equal to one and less than or equal to P, and P is the highest order line spectral pair frequency of the input signal and codewords.

17. The speech recognition system as in claim 16 wherein noise frequencies are primarily located in the frequency range substantially coinciding with the frequency range represented by line spectral pairs i=1 to $N_1$.

18. The speech recognition system as in claim 16 wherein a distance measure, $d(f,\hat{f})$, between input signal parameters, $f$, and reference data parameters, $\hat{f}$, is defined by:

$$d(f,\hat{f}) = \sum_{i=1}^{N_1} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $f_i$ and $\hat{f}_i$ are the ith line spectral pair frequency parameters in the input signal and respective codewords, respectively, $\alpha_1$, $\alpha_2$, $\beta_1$ and $\beta_2$ are are constants, and $e_i$ is the error power spectrum of the input signal and a predicted input signal at the ith line spectral pair frequency of the input signal.

19. The speech recognition system as in claim 18 wherein the constants $\alpha_1$, $\alpha_2$, $\beta_1$ and $\beta_2$ are set to substantially minimize quantization error.

20. A speech recognition system comprising:
a split vector quantizer to receive first parameters of an input signal, to partition the first parameters into $S_1$ partitions to generate first quantization output data, wherein the first quantization output data includes a first observation sequence;
a first speech classifier to receive the first quantization observation sequence from the split vector quantizer and generate first respective speech classification output data;
a split matrix quantizer to receive second parameters of the input signal, to partition the second parameters into $S_2$ partitions to generate second quantization output data, wherein the second quantization output data includes a second observation sequence; and
a second speech classifier to receive the second quantization observation sequence from the split matrix quantizer and generate second respective speech classification output data; and
a hybrid decision generator to combine corresponding first and second respective speech classification data to generate third respective speech classification data and to recognize the input signal from the third respective speech classification data.

21. The speech recognition system as in claim 20 wherein the first and second speech classifiers are a first and second set, respectively, of hidden Markov models.

22. The speech recognition system as in claim 20 wherein:
the speech recognition system has u vocabulary words, and u is an integer;
the first respective speech classification output data includes first respective speech recognition probabilities;
the first respective speech recognition probabilities, $Pr(O_{Vn}|\lambda_{Vn})$, n=1,2, ... u, related to respective ones of the first of n hidden Markov models, $\lambda_{Vn}$, and the first quantization observation, $O_V$, sequence to one of the u vocabulary words, and n is an integer;
the second respective speech classification output data includes second respective speech recognition probabilities;
the second respective speech recognition probabilities, $Pr(O_{Mn}|\lambda_{Mn})$, n=1,2, ... u, related to respective ones of the second of n hidden Markov models, $\lambda_{Mn}$, and the second quantization observation sequence, $O_{Mn}$, to one of the u vocabulary words, and n is an integer;
the combined first and second respective recognition probabilities are respectively $D(n)=\alpha Pr(O_{Mn}|\lambda_{Mn})+Pr(O_{Vn}|\lambda_{Vn})$, n=1, 2, . . . , u and $\alpha$ is a weighting factor to allow $Pr(O_{Vn}|\lambda_{Vn})$ to compensate for recognition errors in $Pr(O_{Mn}|\lambda_{Mn})$ and
the hybrid decision generator is further capable of recognizing the input signal as the ith vocabulary word when D(i) represents the highest probability that the input signal is the ith vocabulary word.

23. The speech recognition system as in claim 20 wherein:
the first parameters of a first partition of the $S_1$ partitions of the input signal include $N_1$ order line spectral pairs and of a second partition of the $S_1$ partitions of the input signal include $N_1+1$ to P order line spectral pairs, wherein P is an integer; and
the split vector quantizer is capable of determining respective a distance measure between an ith line spectral pair frequency of the first parameters of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein $N_1$ is greater than or equal to one and less than or equal to P, and P is the highest order line spectral pair frequency of the first parameters of the input signal and codewords.

24. A speech recognition system comprising:
a split vector quantizer to receive line spectral pair input data corresponding to an input speech signal and to generate a first quantization observation sequence;
first hidden Markov models to receive the first quantization observation sequence from the split vector quantizer and generate first respective speech recognition probabilities from each of the first hidden Markov models;
a split matrix quantizer to receive temporally associated line spectral pair input data corresponding to the input speech signal and to generate a second quantization observation sequence;
second hidden Markov models to receive the second quantization observation sequence from the split matrix quantizer and generate second respective speech recognition probabilities from each of the second hidden Markov models; and
a hybrid decision generator to utilize the first and second respective speech recognition probabilities to generate input signal recognition information and to recognize the input speech signal from the input signal recognition information.

25. The speech recognition system as in claim 24 wherein:
the line spectral pair input data are P order line spectral pairs of the input signal, wherein P is an integer; and
the split vector and split matrix quantizers are each respectively capable of determining respective a distance measure between an ith line spectral pair frequency of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein $N_1$ is greater than or equal to one and less than or equal to P, and P is the highest order line spectral pair frequency of the input signal and codewords.

26. The speech recognition system as in claim 25 wherein the distance measure, $d(f,\hat{f})$, between input signal parameters, $f$, and reference data parameters, $\hat{f}$, is defined by:

$$d(f,\hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

wherein $f_i$ and $\hat{f}_i$ are the ith line spectral pair frequency parameters in the input signal and respective codewords, respectively, the constants $\alpha_1, \alpha_2, \beta_1$ and $\beta_2$ are set to substantially minimize quantization error, and $e_i$ is the error power spectrum of the input signal and a predicted input signal at the ith line spectral pair frequency of the input signal.

27. An apparatus comprising:
- a first speech classifier to operate on $S_1$ partitions of first parameters of an input signal and to provide first output data relating the input signal to first reference data, wherein the input signal parameters include frequency and time domain parameters, wherein $S_1$ is an integer greater than one and the first speech classifier further includes a first set of hidden Markov models;
- a second speech classifier to operate on $S_2$ partitions of second parameters of the input signal and to provide second output data relating the input signal to second reference data, wherein the second parameters of the input signal include the frequency domain parameters, wherein $S_2$ is an integer greater than one and the second speech classifier further includes a second set of hidden Markov models; and
- a hybrid decision generator to combine the first output data and the second output data so that the second output data compensates for errors in the first output data and to generate third output data to classify the input signal.

28. The apparatus as in claim 27 wherein the first speech classifier includes a fuzzy split matrix quantizer, and the second speech classifier includes a fuzzy split vector quantizer.

29. The apparatus as in claim 27 wherein the first speech classifier is capable of operating on each of the $S_1$ partitions of the first parameters of the input signal using respective distance measures to relate the respective partitioned first parameters to partitioned first reference data, and the second speech classifier is capable of operating on each of the $S_1$ partitions of the second parameters of the input signal using respective distance measures to relate the respective partitioned second parameters to partitioned second reference data.

30. The apparatus as in claim 29 wherein at least one of the $S_1$ partitions of first parameters of the input signal are corrupted by noise and the respective distance measure to relate the respective noise corrupted first parameters to partitioned first reference data has noise rejection features; and
- wherein at least one of the $S_2$ partitions of the second parameters of the input signal are corrupted by noise and the respective distance measure to relate the respective noise corrupted second parameters to partitioned second reference data has noise rejection features.

31. The apparatus as in claim 21 wherein the second speech classifier is capable of operating on frequency domain parameters of the input signal.

32. The apparatus as in claim 21 wherein the frequency domain parameters are P order line spectral pair frequencies, wherein P is an integer.

33. The apparatus as in claim 21 wherein the first and second parameters of the input signal further include input signal energy related parameters.

34. The apparatus as in claim 27 wherein:
- the first parameters of a first partition of the $S_1$ partitions of the input signal each respectively include $N_1$ order line spectral pairs of the input signal and of a second partition of the $S_1$ partitions of the input signal include $N_1+1$ to P order line spectral pairs, wherein P is an integer;
- the first speech classifier is capable of determining a respective distance measure between an ith line spectral pair frequency of the first parameters of the input signal and respective ith order line spectral pair frequencies of a plurality of codewords, wherein the distance measure, for i=1 to $N_1$, is proportional to (i) a difference between the ith input signal line spectral pair frequencies and the ith order line spectral pair frequencies of the codewords and (ii) a shift of the difference by an ith frequency shifting factor, wherein $N_1$ is greater than or equal to one and less than or equal to P, and P is the highest order line spectral pair frequency of the first parameters of the input signal and codewords;
- the second parameters of a first partition of the $S_2$ partitions of the input signal each respectively include $N_2$ order line spectral pairs of the input signal and of a second partition of the $S_2$ partitions of the input signal include $N_2+1$ to P order line spectral pairs, wherein P is an integer; and
- the second speech classifier is capable of determining a respective distance measure between an ith line spectral pair frequency of the second parameters of the input signal and respective ith order line spectral pair frequencies of a plurality of codewords, wherein the distance measure, for i=1 to $N_2$, is proportional to (i) a difference between the ith input signal line spectral pair frequencies and the ith order line spectral pair frequencies of the codewords and (ii) a shift of the difference by an ith frequency shifting factor, wherein $N_2$ is greater than or equal to one and less than or equal to P, and P is the highest order line spectral pair frequency of the second parameters of the input signal and codewords.

35. The apparatus as in claim 34 wherein:
the distance measure, $d(f,\hat{f})$, between the first parameters of the input signal, $f$, and the reference data parameters, $\hat{f}$, is defined by:

$$d(f,\hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

wherein $f_i$ and $\hat{f}_i$ are the ith line spectral pair frequency parameters of the first parameters of the input signal and respective codewords, respectively, $\alpha_1$, $\alpha_2$, $\beta_1$ and $\beta_2$ are constants, and $e_i$ is the error power spectrum of the input signal and a predicted input signal at the ith line spectral pair frequency of the first parameters of the first partition of the $S_1$ partitions of the input signal; and the distance measure, $d(f,\hat{f})$, between the second parameters of the input signal, $f$, and the reference data parameters, $\hat{f}$, is defined by:

$$d(f,\hat{f}) = \sum_{i=1}^{N_2} \alpha_1 [(f_i - e_i^{\beta_1} - \hat{f}_i)]^2 + \sum_{i=N_2+1}^{P} \alpha_2 [(f_i - \hat{f}_i)e_i^{\beta_2}]^2$$

wherein $f_i$ and $\hat{f}_i$ are the ith line spectral pair frequency parameters of the second parameters of the input signal and respective codewords, respectively, $\alpha_1$, $\alpha_2$, $\beta_1$ and $\beta_2$ are constants, and $e_i$ is the error power spectrum of the input signal and a predicted input signal at the ith line spectral pair frequency of the second parameters of the input signal.

36. The apparatus as in claim 35 wherein the constants $\alpha_1$, $\alpha_2$, $\beta_1$ and $\beta_2$ are set to substantially minimize classification error.

37. A method comprising:

partitioning first parameters of an input signal into $S_1$ partitions, wherein the parameters include frequency and time domain parameters;

processing the partitioned first parameters of the input signal using a first speech classifier to relate the partitioned first parameters to first reference data;

providing first output data relating the input signal to first reference data, wherein the first output data is provided from the first speech classifier to a second speech classifier;

processing the first output data using the second speech classifier;

providing second output data from the second speech classifier;

partitioning second parameters of the input signal into $S_2$ partitions, wherein the parameters include frequency domain parameters;

processing the partitioned second parameters of the input signal using a third speech classifier to relate the partitioned second parameters to second reference data;

providing third output data relating the input signal to the second reference data, wherein the third output data is provided from the third speech classifier to a fourth speech classifier;

processing the third output data using the fourth speech classifier;

providing fourth output data from the fourth speech classifier; combining the third output data and fourth output data to compensate for speech classification errors in the third output data; and classifying the input signal as recognized speech.

38. The method as in claim 37 wherein:

the first parameters of a first partition of the $S_1$ partitions of the input signal include $N_1$ order line spectral pairs and of a second partition of the $S_1$ partitions of the input signal include $N_1+1$ to P order line spectral pairs, wherein P is an integer;

the second parameters of a first partition of the $S_2$ partitions of the input signal each respectively include $N_1$ order line spectral pairs of the input signal and of a second partition of the $S_2$ partitions of the input signal include $N_1+1$ to P order line spectral pairs, wherein P is an integer;

processing the first parameters of a first partition of the $S_1$ partitions of the input signal comprises:

determining a first distance measure between an ith line spectral pair frequency of the first parameters of the input signal and respective ith order line spectral pair frequencies of a plurality of first codewords, wherein the distance measure, for i=1 to $N_1$, is proportional to (i) a difference between the ith input signal line spectral pair frequencies and the ith order line spectral pair frequencies of the first codewords and (ii) a shift of the difference by an ith frequency shifting factor, wherein $N_1$ is greater than or equal to one and less than or equal to P, and P is the highest order line spectral pair frequency of the first parameters of the input signal and the first codewords; and processing the second parameters of a first partition of the $S_2$ partitions of the input signal comprises:

determining a second distance measure between an ith line spectral pair frequency of the second parameters of the input signal and respective ith order line spectral pair frequencies of a plurality of second codewords, wherein the distance measure, for i=1 to $N_1$, is proportional to (i) a difference between the ith input signal line spectral pair frequencies and the ith order line spectral pair frequencies of the second codewords and (ii) a shift of the difference by an ith frequency shifting factor, wherein $N_1$ is greater than or equal to one and less than or equal to P, and P is the highest order line spectral pair frequency of the second parameters of the input signal and the second codewords.

39. The method as in claim 37 wherein:

the first and second reference data each represent u vocabulary words, and u is an integer;

the first output data includes a first observation sequence, $O_{Vn}$, relating the input signal to the reference data;

the second speech classifier includes a first set of n hidden Markov models;

the second output data includes probabilities, $Pr(O_{Vn}|\lambda_{Vn})$, n=1, 2, ..., u, related to respective ones of the first set of n hidden Markov models, $\lambda_{Vn}$, and the first observation sequence, $O_{Vn}$;

the third output data includes a second observation sequence, $O_{Mn}$, relating the input signal to the reference data;

the fourth speech classifier includes a second set of n hidden Markov models; the fourth output data includes probabilities, $Pr(O_{Mn}|\lambda_{Mn})$, n=1, 2, ..., u, related to respective ones of the second set of n hidden Markov models, $\lambda_{Mn}$, and the second observation sequence, $O_{Mn}$;

combining the third output data and fourth output data comprises:

combining the probabilities $Pr(O_{Vn}|\lambda_{Vn})$ and $Pr(O_{Mn}|\lambda_{Mn})$ into a combination, D(n), wherein $D(n)=\alpha Pr(O_{Mn}|\lambda_{Mn})+Pr(O_{Vn}|\lambda_{Vn})$, n=1, 2, ..., u and $\alpha$ is a weighting factor to allow $Pr(O_{Vn}|\lambda_{Vn})$ to compensate for speech classification errors in $Pr(O_{Mn}|\lambda_{Mn})$; and classifying the input signal as recognized speech comprises:

classifying the input signal as the ith of the u vocabulary words when D(i) represents the highest probability that the input signal is the ith vocabulary word.

40. The method as in claim 37 wherein combining the third output data and fourth output data comprises:

weighting the second output data; and adding the weighted second output data to the first output data.

41. The method as in claim 37 wherein partitioning first parameters of an input signal into $S_1$ partitions comprises:

partitioning the first parameters of the input signal to group at least one subset of the first parameters which are generally corrupted by localized noise.

42. The method as in claim 41 wherein the first parameters and first reference data include respective corresponding line spectral pair frequencies, the second parameters and second reference data include respective corresponding line spectral pair frequencies, and the subset of the first parameters which are generally corrupted by localized noise are the mth through nth line spectral frequencies, processing the partitioned first parameters further comprising:

matrix quantizing the mth through nth line spectral frequencies of the first parameters using a distance measure proportional to (i) a difference between the ith input signal line spectral pair frequencies and the ith order first reference data line spectral pair frequencies and (ii) a weighting of the difference by an ith frequency weighting factor, wherein m is less than or equal to i, and n is greater than or equal to i; and processing the second parameters further comprising:
vector quantizing the mth through nth line spectral frequencies of the second parameters using a distance measure proportional to (i) a difference between the ith input signal line spectral pair frequencies and the ith order second reference data line spectral pair frequencies and (ii) a weighting of the difference by an ith frequency weighting factor, wherein m is less than or equal to i.

43. The method as in claim 37 wherein processing the partitioned first parameters of the input signal comprises:
matrix quantizing each of the partitioned first parameters of the input signal; and
processing second parameters of the input signal comprises:
vector quantizing each of the partitioned second parameters of the input signal.

44. The method as in claim 43 wherein processing the partitioned first parameters of the input signal further comprises:
determining first respective input signal recognition probabilities from a plurality of first hidden Markov models; and
wherein processing the partitioned second parameters of the input signal further comprises:
determining second respective input signal recognition probabilities from a plurality of second hidden Markov models.

45. The method as in claim 43 wherein matrix quantizing further comprises:
fuzzy matrix quantizing each of the partitioned first parameters of the input signal; and
wherein vector quantizing further comprises:
fuzzy vector quantizing each of the partitioned second parameters of the input signal.

46. The method as in claim 45 wherein fuzzy matrix quantizing further comprises:
fuzzy matrix quantizing each of the partitioned first parameters of the input signal using a first codebook; and
wherein fuzzy vector quantizing further comprises:
fuzzy vector quantizing each of the partitioned second parameters of the input signal using a second single codebook.

47. A method of recognizing speech comprising:
receiving an input signal; determining parameters of the input signal;
split vector quantizing the parameters of the input signal to obtain first quantization output data;
classifying the first quantization output data using a first probabilistic process;
split matrix quantizing the parameters of the input signal to obtain second quantization output data;
classifying the second quantization output data using a second probabilistic process; and
generating an identification of the input signal as recognized speech based upon the classification of the first and second quantization output data.

48. The method as in claim 47 wherein generating the identification of the input signal further comprises:
weighting the classification of the first quantization output data; and
adding a the weighted classification of the first quantization output data and the classification of the second quantization output data.

49. The method as in claim 47 wherein determining parameters of the input signal comprises:
determining P order line spectral pairs for each of TO frames of the input signal.

50. The method as in claim 47 wherein split vector quantizing further comprises:
split vector quantizing the parameters of the input signal using a first single codebook; and
wherein split matrix quantizing further comprises:
split matrix quantizing the parameters of the input signal using a second single codebook.

51. The method as in claim 47 wherein split vector quantizing further comprises:
fuzzy split vector quantizing the parameters of the input signal, wherein the first quantization output data is fuzzy data; and
wherein split matrix quantizing further comprises:
fuzzy split matrix quantizing the parameters of the input signal, wherein the second quantization output data is fuzzy data.

52. The method as in claim 47 wherein:
the identification of the input signal is one of u vocabulary words, and u is an integer;
the first quantization output data is a first observation sequence, $O_{Vn}$, relating the input signal to the u vocabulary words;
classifying the first quantization output data comprises:
determining probabilities, $Pr(O_{Vn}|\lambda_{Vn})$, n=1, 2, ..., u, related to respective ones of a first set of n hidden Markov models, $\lambda_{Vn}$, and the first observation sequence, $O_{Vn}$;
the second quantization output data is a second observation sequence, $O_{Mn}$, relating the input signal to the u vocabulary words;
classifying the first quantization output data comprises:
determining probabilities, $Pr(O_{Mn}|\lambda_{Mn})$, n=1, 2, ..., u, related to respective ones of a second set of n hidden Markov models, $\lambda_{Mn}$, and the second observation sequence, $O_{Mn}$; and
generating an identification of the input signal further comprises:
combining the probabilities $Pr(O_{Vn}|\lambda_{Vn})$ and $Pr(O_{Mn}|\lambda_{Mn})$ into a combination, D(n), wherein $D(n)=\alpha Pr(O_{Mn}|\lambda_{Mn})+Pr(O_{Vn}|\lambda_{Vn})$, n=1, 2, ..., u and $\alpha$ is a weighting factor to allow $Pr(O_{Vn}|\lambda_{Vn})$ to compensate for speech classification errors in $Pr(O_{Mn}|\lambda_{Mn})$, and the identification of the input signal is the ith of the u vocabulary words when D(i) represents the highest probability that the input signal is the ith vocabulary word.

53. The method as claim 47 wherein:
the parameters of the input signal include a first partition of the input signal into $N_1$ order line spectral pairs and a second partition into $N_1+1$ to P order line spectral pairs of the input signal, wherein P is an integer; and
split vector quantizing the parameters of the input signal comprises:

determining a first distance measure between an ith line spectral pair frequency of the input signal and respective ith order line spectral pair frequencies of a plurality of first codewords, wherein the distance measure, for i=1 to $N_1$, is proportional to (i) a difference between the ith input signal line spectral pair frequencies and the ith order line spectral pair frequencies of the first codewords and (ii) a shift of the difference by an ith frequency shifting factor, wherein $N_1$ is greater than or equal to one and less than or equal to P, and P is the highest order line spectral pair frequency of the input signal and the first codewords; and matrix quantizing the parameters of the input signal comprises:

determining a second distance measure between an ith line spectral pair frequency of the input signal and respective ith order line spectral pair frequencies of a plurality of second codewords, wherein the distance measure, for i=1 to $N_1$, is proportional to (i) a difference between the ith input signal line spectral pair frequencies and the ith order line spectral pair frequencies of the second codewords and (ii) a shift of the difference by an ith frequency shifting factor, wherein $N_1$ is greater than or equal to one and less than or equal to P, and P is the highest order line spectral pair frequency of the input signal and the second codewords.

54. The method as in claim 53 wherein the first distance measures, $d(f,\hat{f})$, between the input signal parameters, $f$, and the reference data parameters, $\hat{f}$, is defined by:

$$d(f,\hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

wherein $d(f,\hat{f})$, $f_i$ and $\hat{f}_i$ are the ith line spectral pair frequency parameters in the input signal and the respective first codewords, the constants $\alpha_1, \alpha_2, \beta_1$ and $\beta_2$ are set to substantially minimize respective processing error, and $e_i$ is the error power spectrum of the input signal and a predicted input signal at the ith line spectral pair frequency of the input signal; and the second distance measures, $d(f,\hat{f})$, between the input signal parameters, $f$, and the reference data parameters, $\hat{f}$, is defined by:

$$d(f,\hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

wherein $d(f,\hat{f})$, $f_i$ and $\hat{f}_i$ are the ith line spectral pair frequency parameters in the input signal and the respective second codewords, the constants $\alpha_1, \alpha_2, \beta_1$ and $\beta_2$ are set to substantially minimize respective processing error, and $e_i$ is the error power spectrum of the input signal and a predicted input signal at the ith line spectral pair frequency of the input signal.

55. The apparatus as in claim 54 wherein the constants $\alpha_1, \alpha_2, \beta_1$ and $\beta_2$ are set to substantially minimize quantization error.

56. The speech recognition system as in claim 23 wherein the distance measure, $d(f,\hat{f})$, between the first parameters of the input signal, $f$, and the reference data parameters, $\hat{f}$, is defined by:

$$d(f,\hat{f}) = \sum_{i=1}^{N_1} \alpha_1 [(f_i - e_i^{\beta_1} - \hat{f}_i)]^2 + \sum_{i=N_1+1}^{P} \alpha_2 [(f_i - \hat{f}_i)e_i^{\beta_2}]^2$$

wherein $f_i$ and $\hat{f}_i$ are the ith line spectral pair frequency parameters of the first parameters of the first partition of the $S_1$ partitions of the input signal and respective codewords, respectively, the constants $\alpha_1, \alpha_2, \beta_1$ and $\beta_2$ are set to substantially minimize quantization error, and $e_i$ is the error power spectrum of the first parameters of the first partition of the input signal and a predicted input signal at the ith line spectral pair frequency of the first parameters of the first partition of the input signal.

57. A method of recognizing speech comprising:

receiving an input signal;

determining D order line spectral pairs for TO frames of the input signal, wherein D and TO are integers;

determining parameters related to the energy of the input signal, wherein the parameters related to the energy of the input signal include the input signal energy and a first derivative of the input signal energy;

split vector quantizing the D order line spectral pairs for each of the TO frames and the parameters related to the input signal energy;

classifying the input signal using the split vector quantization of the D order line spectral pairs;

split matrix quantizing the D order line spectral pairs and the parameters related to the input signal energy for T matrices of frames of the input signal, wherein T is defined as int(TO|N), and N is the number for input signal frames represented in each of the T matrices;

classifying the input signal using the split matrix quantization of the D order line spectral pairs and parameters related to the input signal energy;

combining the classifications of the input signal to generate a combination of the classifications; and recognizing the input signal as particular speech from the combination of the classifications.

58. The method as in claim 57 wherein:

split vector quantizing the D order line spectral pairs comprises:

determining a first distance measure between an ith line spectral pair frequency of the input signal and respective ith order line spectral pair frequencies of a plurality of first codewords, wherein the distance measure, for i=1 to $N_1$ in a first partition of the D order line spectral pairs, is proportional to (i) a difference between the ith input signal line spectral pair frequencies and the ith order line spectral pair frequencies of the first codewords and (ii) a shift of the difference by an ith frequency shifting factor, wherein $N_1$ is greater than or equal to one and less than or equal to D, and D is the highest order line spectral pair frequency of the input signal and the first codewords;

split matrix quantizing the D order line spectral pairs comprises:

determining a second distance measure between an ith line spectral pair frequency of the input signal and respective ith order line spectral pair frequencies of a plurality of second codewords, wherein the distance measure, for i=1 to $N_2$ in a second partition of the D order line spectral pairs, is proportional to (i) a difference between the ith input signal line spectral pair frequencies and the ith order line spectral pair frequencies of the second codewords and (ii) a shift of the difference by an ith frequency shifting factor, wherein $N_2$ is greater than or equal to one and less than or equal to D, and D is the highest order line spectral pair frequency of the input signal and the second codewords;

the first distance measures, $d(f,\hat{f})$, between the input signal parameters, $f$ and the reference data parameters, $\hat{f}$, is defined by:

$$d(f,\hat{f}) = \sum_{i=1}^{N_1} \alpha_1 \left[(f_i - e_i^{\beta_1} - \hat{f}_i)\right]^2 + \sum_{i=N_1+1}^{P} \alpha_2 \left[(f_i - \hat{f}_i)e_i^{\beta_2}\right]^2$$

wherein $d(f,\hat{f})$, $\hat{f}_i$ and are the ith line spectral pair frequency parameters in the input signal and the respective first codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the input signal; and the second distance measures, $d(f,\hat{f})$, between the input signal parameters, $f$, and the reference data parameters, $\hat{f}$, is defined by:

$$d(f,\hat{f}) = \sum_{i=1}^{N_2} \alpha_1 \left[(f_i - e_i^{\beta_1} - \hat{f}_i)\right]^2 + \sum_{i=N_2+1}^{P} \alpha_2 \left[(f_i - \hat{f}_i)e_i^{\beta_2}\right]^2$$

wherein $d(f,\hat{f})$, $f_i$ and $\hat{f}_i$ are the ith line spectral pair frequency parameters in the input signal and the respective second codewords, the constants $\alpha_1$, $\alpha_2$, $\beta_1$ and $\beta_2$ are set to substantially minimize respective processing error, and $e_i$ is the error power spectrum of the input signal and a predicted input signal at the ith line spectral pair frequency of the input signal.

* * * * *